United States Patent [19]

Iguchi et al.

[11] Patent Number: 5,396,156
[45] Date of Patent: Mar. 7, 1995

[54] CONVERGENCE CORRECTION CIRCUIT FOR CATHODE RAY TUBE

[75] Inventors: Yukinobu Iguchi, Kanagawa; Hiromu Hosokawa, Chiba; Ichiro Utsumi; Nobuya Okano, both of Kanagawa; Tsunenari Saito, Tokyo, all of Japan

[73] Assignee: Sony Corporation, Tokyo, Japan

[21] Appl. No.: 126,186

[22] Filed: Sep. 24, 1993

[30] Foreign Application Priority Data

Sep. 28, 1992 [JP] Japan .................................. 4-258567

[51] Int. Cl.$^6$ .............................................. H01J 29/51
[52] U.S. Cl. ........................... 315/368.15; 315/368.18
[58] Field of Search ...................... 315/368.15, 368.18, 315/368.21; 313/412

[56] References Cited

U.S. PATENT DOCUMENTS

| | | | |
|---|---|---|---|
| 3,452,240 | 6/1967 | Tokita et al. | 315/368.15 |
| 3,548,248 | 12/1970 | Tokita et al. | 315/368.15 |
| 3,638,064 | 1/1972 | Hoyosa et al. | 315/368.15 |

*Primary Examiner*—Gregory C. Issing
*Attorney, Agent, or Firm*—Jay H. Maioli

[57] ABSTRACT

A dynamic convergence apparatus of a simplified arrangement can reduce a distortion of a beam spot on a periphery of a picture screen and improve a focusing, wherein a parallel circuit of a high resistance value resistor (R) and a diode (D) is connected between low voltage side electrode plates (3), (4) and high voltage side electrode plates (1), (2) to which an anode voltage (HV) is applied, a capacitor (C) is formed by coating a conductive layer on the inside and outside of a tube envelope of a color CRT while glass of the tube envelope is used as a dielectric material, and a convergence voltage which results from adding a vertical parabolic wave voltage to the horizontal blanking period of a modulated voltage provided by amplitude-modulating a DC voltage very slightly lower than the anode voltage (HV) by horizontal and vertical parabolic waves is commonly supplied from one end side (outside of the tube envelope) of the capacitor (C) to the low voltage side electrode plates (3), (4).

19 Claims, 22 Drawing Sheets

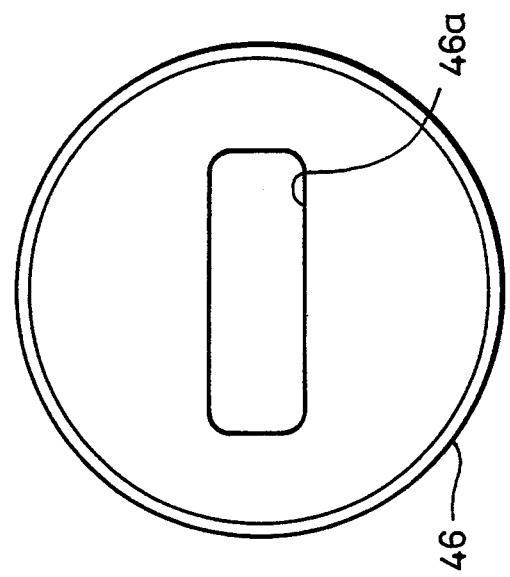
FIG.12A
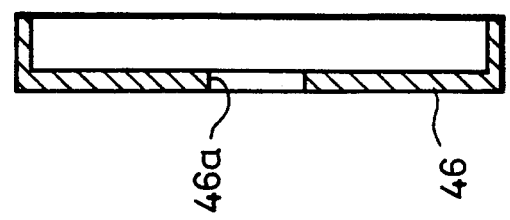
FIG.12C  FIG.12B
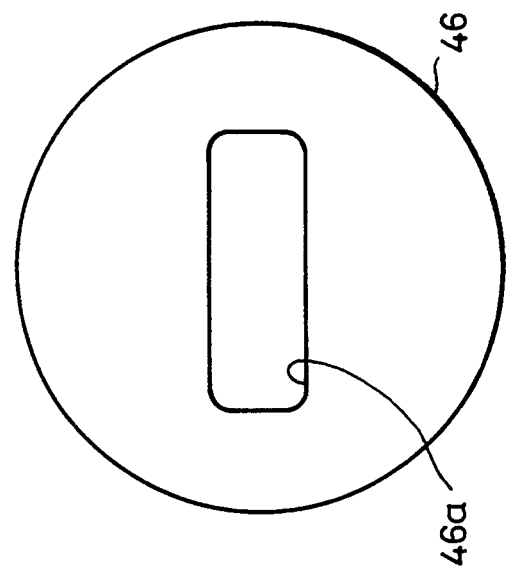
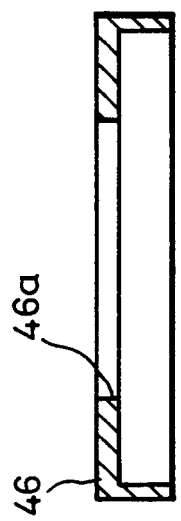
FIG.12D

5,396,156

CONVERGENCE CORRECTION CIRCUIT FOR CATHODE RAY TUBE

BACKGROUND OF THE INVENTION

1. Field of the Invention

The present invention relates to a dynamic convergence apparatus provided in a color cathode ray tube.

2. Description of the Prior Art

In an inline 3-beam system color cathode ray tube (hereinafter simply referred to as a color CRT), if electron beams are converged at the central portion of a picture screen thereof when a deflection magnetic field of a deflection yoke is a uniform magnetic field, then a dynamic convergence of a longitudinal arch type is generated at the upper and lower and right and left porions of the picture screen as shown in FIG. 1. FIG. 1 of the accompanying drawings shows such dynamic convergence thus generated and in which R (red) and B (blue) represent beams of the respective sides and G (green) represents a central beam. Therefore, there have heretofore been proposed dynamic convergence apparatus which carry out the dynamic convergence by largely distorting a deflection magnetic field of the deflection yoke (barrel magnetic field and pin-cushion magnetic field). According to the conventional dynamic convergence apparatus, however, a beam spot of an electron beam is distorted at the peripheral portion of the picture screen of the color CRT and a focusing is deteriorated.

To remove the aforesaid drawbacks, there is proposed a dynamic convergence apparatus having a quadrupole coil provided at the rear stage of a deflection yoke in which a convergence current is flowed to the quadrupole while the deflection magnetic field of the deflection yoke remains as the uniform magnetic field. In this case, however, the deflection magnetic field is still distorted and the distortion of the beam spot of the electron beam on the peripheral portion of the picture screen of the color CRT cannot be removed completely. Further, this apparatus is not suitable for a multi-scan monitor because a current flowed to the quadrupole coil is controlled. Furthermore, in this apparatus, waveforms cannot be fine controlled without difficulty and the convergence cannot be fine adjusted on a very small region of the picture screen.

As a dynamic convergence apparatus of special use, there is proposed a method in which a convergence voltage modulated by an external transformer is supplied to convergence plates of an electron gun via a coaxial cable. Although this conventional dynamic convergence apparatus can improve convergence at the peripheral portion of the picture screen of the color CRT to some extent, this apparatus needs a high voltage transformer so that this apparatus becomes expensive and cannot be applied to consumer color television receivers.

Further, there has heretofore been proposed a dynamic convergence apparatus in which resistors of high resistance value are connected to a pair of inside electrodes and a pair of outside electrodes within the color CRT, capacitors are formed by forming conductive layers on the inner and outer surfaces of a tube envelope of the color CRT and a convergence voltage is applied to a pair of outside electrodes provided within the CRT from the outside of the tube envelop through capacitors.

A conventional dynamic convergence apparatus (see Japanese published patent publication No. 55-20633) will hereinafter be described with reference to FIG. 2. In FIG. 2 reference numeral 22 generally denotes an overall arrangement of an electron gun apparatus of a Trinitron (registered trademark) bipotential type in which three electron beams of red, green and blue are positioned in line.

Cathodes 23R, 23G and 23B for red, green and blue electron beams are provided within the horizontal plane in line. Common first to fourth grids 12, 13, 14 and 15 are arrayed sequentially on the central axis of the envelope, in that order. Convergence means 5 is provided at the rear stage side of the fourth grid 15. Second and third grids 13, 14 constitute a common pre-focus electronic lens for the red, green and blue electron beams R, G and B. Third and fourth grids 14, 15 constitute a common main electronic lens. The red, green and blue electron beams R, G, B are crossed at substantially the center of the main electronic lens by the pre-focus lens and then diverged. The center electron beam G passes through a space between a pair of high voltage side electrode plates 1 and 2 of the convergence means 5. The red electron beam R passes through a space between the high voltage side electrode plate 2 and a low voltage side electrode plate 4. The blue electron beam B passes through a space between the high voltage side electrode plate 1 and a low voltage side electrode plate 3.

A capacitor 7 is formed by forming conductive layers 7A, 7B of semi-annular shapes on the inner and outer surfaces of the tube wall of a neck portion 6N of a tube envelope 6 at its position where the convergence means 5 is provided. An insulating layer 24 made of a material such as ceramics or the like is stretched across the fourth grid 15 and the low voltage side electrode plate 3. A resistance coating film 25 is coated on one surface of the insulating plate 24 at its one half portion at the fourth grid 15 side. Electrodes 26, 27 are attached to both ends of the resistance coating film 25 to form a resistor 28 having a high resistance value. Another capacitor 32 in such a manner that electrodes 30, 31 made of a stainless steel are soldered to both surfaces of a dielectric thin member 29 made of barium titanate by silver is attached to one surface of the insulating plate 24 on its another half portion. A conductive member 33 is also attached to the electrode 26 of the high resistance value resistor 28 by welding. The conductive member 33 is attached to the fourth grid 15 by welding. A conductive leaf spring 34 is stretched across the electrode 27 of the high resistance value resistor 28 and the electrode 30 of the capacitor 32. A free end of the conductive leaf spring 34 is brought in contact with the inside conductive layer 7A, and a conductive member 35 is attached to the other electrode 31 of the capacitor 32 by welding. The conductive member 35 is attached to the low voltage side electrode plate 3 by welding.

The high voltage side electrode plates 1 and 2 are connected via a conductor 10, and the electrode plate 2 is connected to the fourth grid 15 by a conductor 11. An elongated portion 16a of an inside conductive layer 16 deposited on the inner surface of the funnel portion of the tube envelope 6 is formed within the neck portion 6N. A conductive resilient contact member 17 is attached to the fourth grid 15 so as to contact with the elongated portion 16a, whereby an anode voltage applied to the inside conductive layer 16 from the external conductor of a coaxial anode button attached to the funnel portion of the tube envelope 6 is supplied to the fourth grid 15 and the high voltage side electrode plates 1, 2.

A conductive semi-annular shaped plate spring 18 is inserted into the neck portion 6N of the tube envelope 6 at its end portion of the funnel portion side. A conductive resilient contact member 19 is attached to the low voltage side electrode plate 4 and is brought in contact with the plate spring 18. Then, the convergence voltage (which will be described later on) that results from dividing a high DC voltage by a resistor is supplied to the inside conductor through a core of a coaxial anode button. The convergence voltage is supplied to the low voltage side electrode plates 3, 4 by connecting the inside conductor to the plate spring 18 through a conductor 21 covered with an insulating tube 20. While the capacitor 7 is formed on the neck portion 6N at its portion near the funnel portion as shown in FIG. 2, the capacitor 7 may be formed on the neck portion 6N at its portion near the center around the elongated portion 16a of the inside conductive layer 16. Also in this case, the conductors 7A, 7B constructing the capacitor 7 cannot be deposited in perfect annular shape and deposited in semiannular shape such that they are prevented from contacting with the elongated portion 16a.

The example of the conventional dynamic convergence apparatus shown in FIG. 2 will further be described with also reference to its equivalent circuit shown in FIG. 3.

As shown in FIG. 3, a convergence voltage (dynamic convergence voltage) $e_{c1}$ supplied from a convergence correction voltage signal generating source 36a having an inner resistor 39 is supplied through the capacitor 7 formed by utilizing the tube envelope 6 and the capacitor 32 within the tube envelop 6 to the low voltage side electrode plates 3, 4. On the other hand, an anode voltage Eb is directly supplied to the high voltage side electrode plates 1, 2 and to the inside conductive layer 7A through the resistor 28 within the tube envelope 6. In this case, because the capacitor 32 is provided, the anode voltage Eb is prevented from being supplied to the low voltage side electrode plates 3, 4. The low voltage side electrode plates 3, 4 are supplied with a convergence voltage Ec that results from dividing the anode voltage Eb by the resistors 37, 38. In FIG. 3, reference numeral 40 designates a coating capacitance. The capacitance of the capacitor 7 is selected to be in a range of from about 100 pF to 200 pF when a color CRT has a diameter of 29 mm at the neck portion of the tube envelope 6. A withstand voltage thereof must be selected to be about 2 kV. A resistance value of the high resistance value resistor 28 is selected to be in a range of from about 30 MΩ to 100 MΩ.

However, the conventional dynamic convergence apparatus thus arranged encounters the following drawbacks:

When the convergence voltage is supplied from the outside to the inside through the capacitor 7 which is provided by depositing the conductive layers 7A, 7B on the inner and outer surface of the tube envelope 6 of the color CRT, if the convergence voltage is obtained by effecting the amplitude modulation by the parabolic wave of horizontal and vertical period, a low frequency component, i.e., vertical parabolic component cannot be transmitted. For this reason, the component that results from effecting the amplitude modulation only by the horizontal parabolic wave is supplied to the inside from the outside through the capacitor 7 that is obtained by depositing the conductive layers 7A, 7B on the inner and outer surfaces of the tube envelope 6 of the color CRT as the convergence voltage. The vertical parabolic wave component is supplied to the deflection yoke or quadrupole. Such arrangement is complicated from a system standpoint and is not so effective in improving a defocusing of an electron beam at the peripheral portion of the picture screen of the color CRT.

This will be described more. Assuming that the capacitance of the capacitor 7 and the resistance value of the high resistance value resistor 28 shown in FIGS. 2 and 3 are 50 pF and 50 MΩ, then a time constant $\tau$ is expressed as:

$$\tau = 50 \times 10^{-12} \times 50 \times 10^6 = 2.5 \text{ msec}$$

Although the alternating current signal of horizontal period can be transmitted because the time constant $\tau$ is sufficiently long as compared with a period 63.5 μS of a horizontal deflection frequency 15.75 kHz, an alternating current signal (vertical parabolic component) of vertical period cannot be transmitted unless the resistance value or capacity is made about 15 times larger because the vertical deflection frequency is 60 Hz (16.7 msec).

The capacitor 7 of such large capacity is not advantageous in actual practice in use. If a resistor having a larger resistance value is used as the high resistance value resistor 28, then a voltage fluctuation of several Volts is generated even by a very small current of several 10 s of nanoamperes and a convergence error occurs. Accordingly, a limit of the time constant $\tau$ is several microseconds.

OBJECTS AND SUMMARY OF THE INVENTION

Therefore, it is an object of the present invention to provide an improved dynamic convergence apparatus in which the aforesaid shortcomings and disadvantages encountered with the prior art can be eliminated.

More specifically, it is an object of the present invention to provide a dynamic convergence apparatus which can reduce a distortion of a beam spot of an electron beam at the periphery of a picture screen of a color CRT.

Another object of the present invention is to provide a dynamic convergence apparatus in which a focusing can be carried out satisfactorily.

Still another object of the present invention is to provide a dynamic convergence apparatus in which a dynamic focusing voltage necessary for focusing the periphery of the picture screen of the color CRT is small.

A further object of the present invention is to provide a dynamic convergence apparatus in which a convergence can be fine adjusted with ease.

Yet a further object of the present invention is to provide a dynamic convergence apparatus which can be applied to a multi-scan monitor with ease.

Yet a further object of the present invention is to provide a dynamic convergence apparatus in which a waveform of a voltage can be locally shaped with ease.

Still a further object of the present invention is to provide a dynamic convergence apparatus in which the aforesaid objects can be achieved even when a high voltage DC voltage (anode voltage) applied to an anode button is changed suddenly.

According to an aspect of the present invention, there is provided a dynamic convergence apparatus for a cathode ray tube having an electron beam generating device for generating first, second, and third electron beams which comprises first pair of convergence plates arranged such that the second electron beam passes between the convergence plates, second pair of convergence plates arranged such that the first electron beam passes between one of the first pair of convergence plates and one of the second pair of convergence plates and the third electron beam passes between the other of the first pair of convergence plates and the other of the second pairs of convergence plates, a device for generating a DC voltage applied to the first pair of convergence plates, a device for generating a convergence voltage having a first voltage waveform of a modulated voltage modulated by a parabolic signal with a horizontal deflection frequency and a parabolic signal with a vertical deflection frequency and a second voltage waveform of a parabolic signal of a vertical deflection frequency added to a horizontal retrace interval of the first voltage waveform, and a device for applying the convergence voltage to the second pair of convergence plates, the applying means including a series circuit of a capacitor, and a parallel circuit of a diode and a resistor, a connection point of the capacitor and the parallel circuit being connected to the second pair of convergence plates and another end of the parallel circuit opposite to the connection point being connected to a reference voltage source.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIG. 12A is a plan view of the shield electrode according to the seventh embodiment of the present invention;

FIG. 12B is a longitudinal cross-sectional view of the shield electrode according to the seventh embodiment of the present invention;

FIG. 12C is a bottom view of the shield electrode according to the seventh embodiment of the present invention;

FIG. 12D is a transversal cross-sectional view of the shield electrode according to the seventh embodiment of the present invention;

DETAILED DESCRIPTION OF THE PREFERRED EMBODIMENTS

Figure 1:
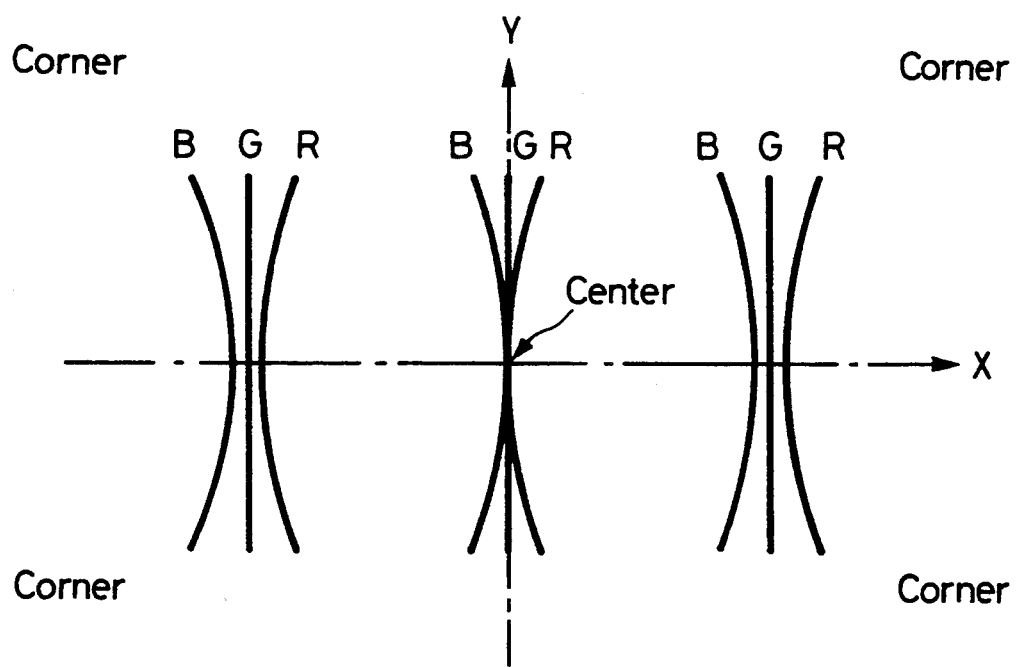
FIG. 1 is a diagram showing a convergence error.
Figure 2:
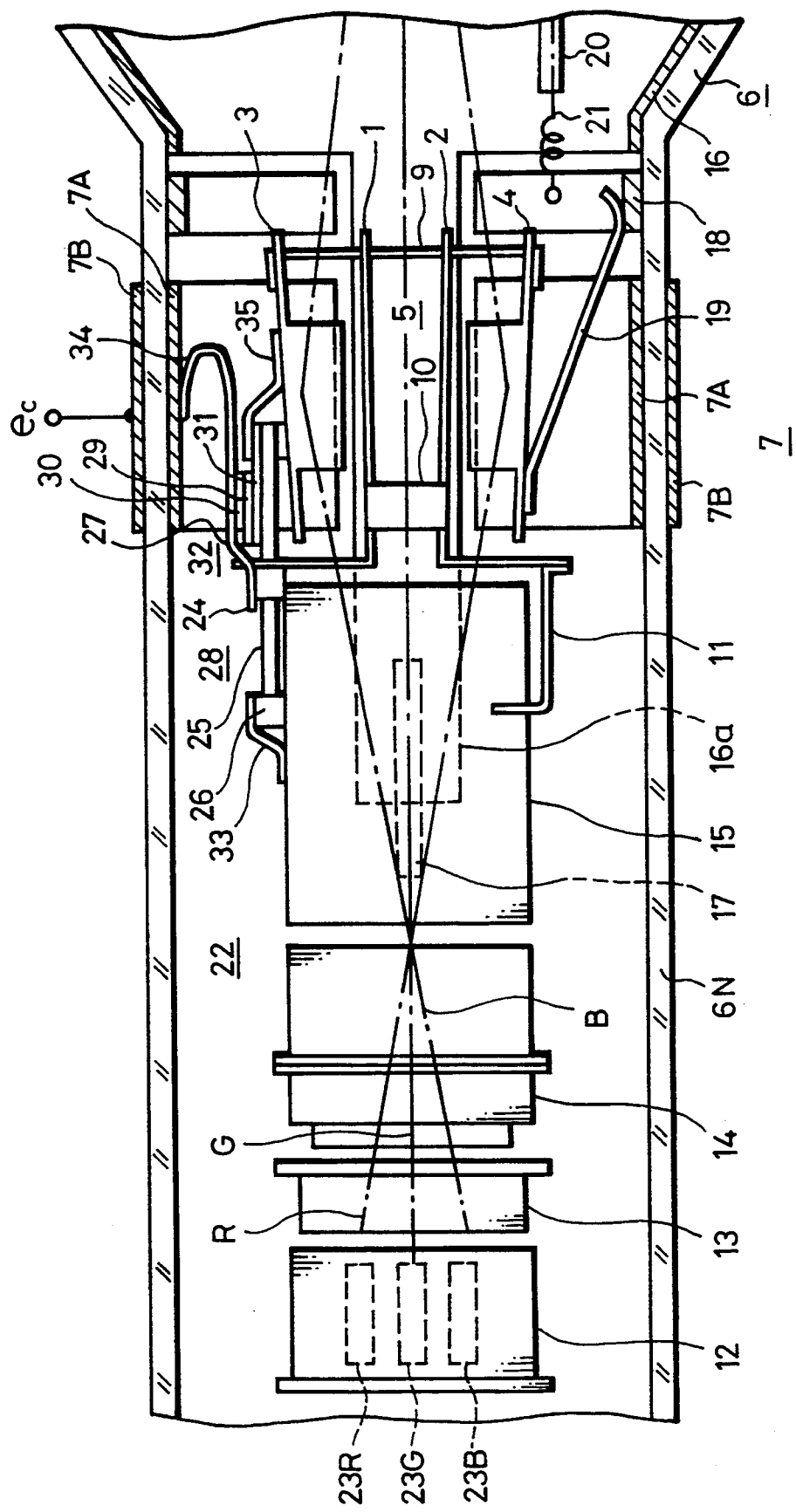
FIG. 2 is a fragmentary cross-sectional view showing a color CRT according to the prior art.
Figure 3:
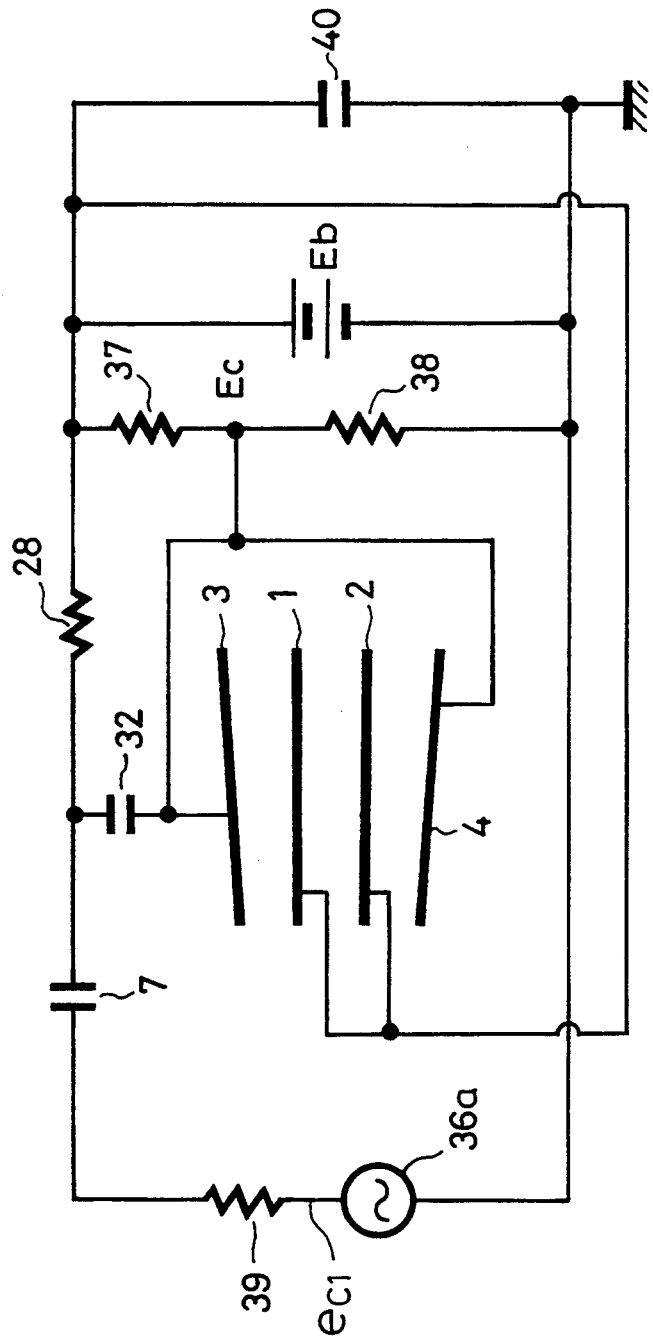
FIG. 3 is a circuit diagram showing an equivalent circuit of the prior art shown in FIG. 2.

Embodiments of the present invention will now be described with reference to the drawings. In the drawings which follow, like parts corresponding to those of FIGS. 2 and 3 are marked with the same references.

Figure 4:
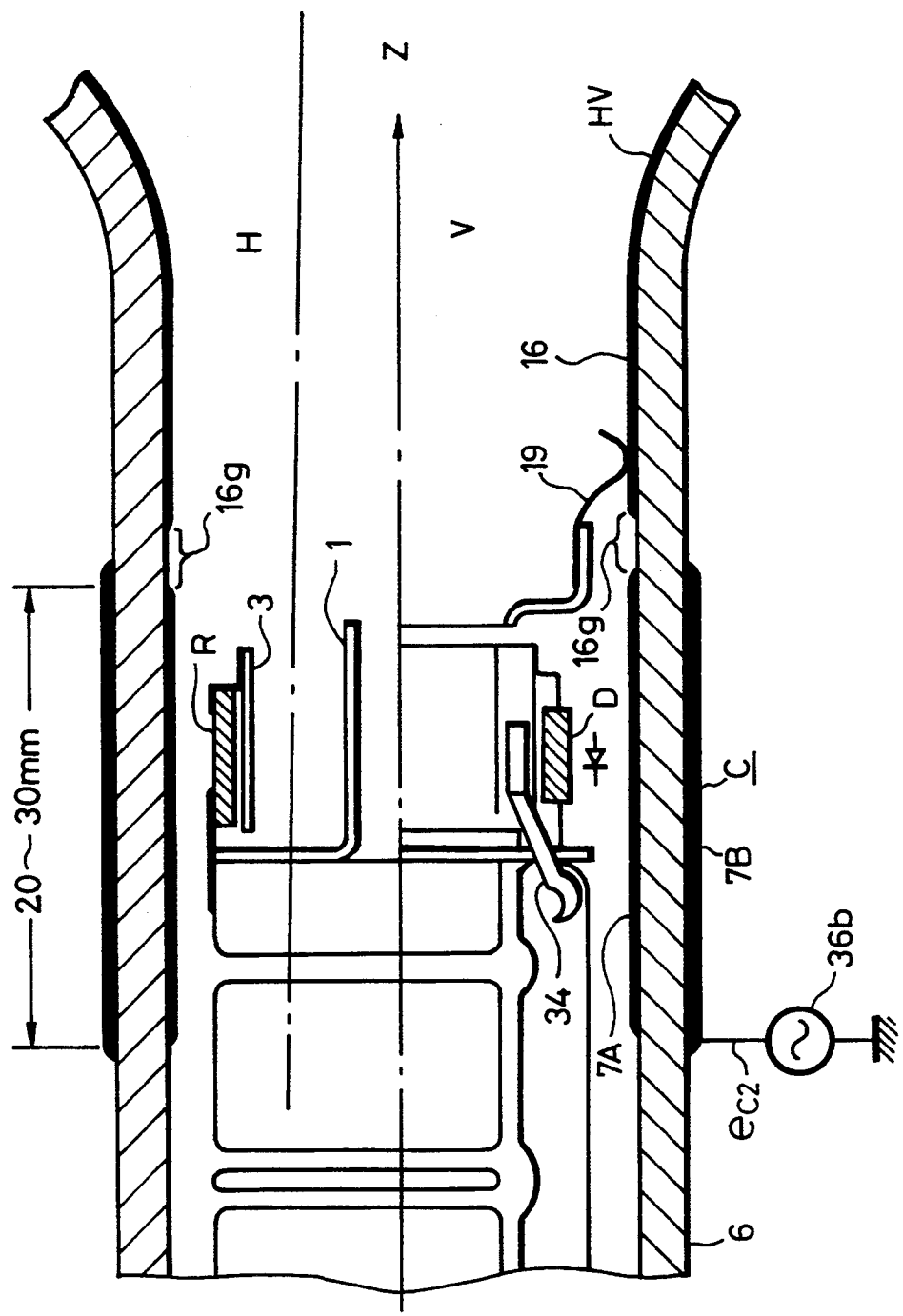
FIG. 4 is a fragmentary cross-sectional view showing an arrangement of a color CRT according to a first embodiment of the present invention.
Figure 5:
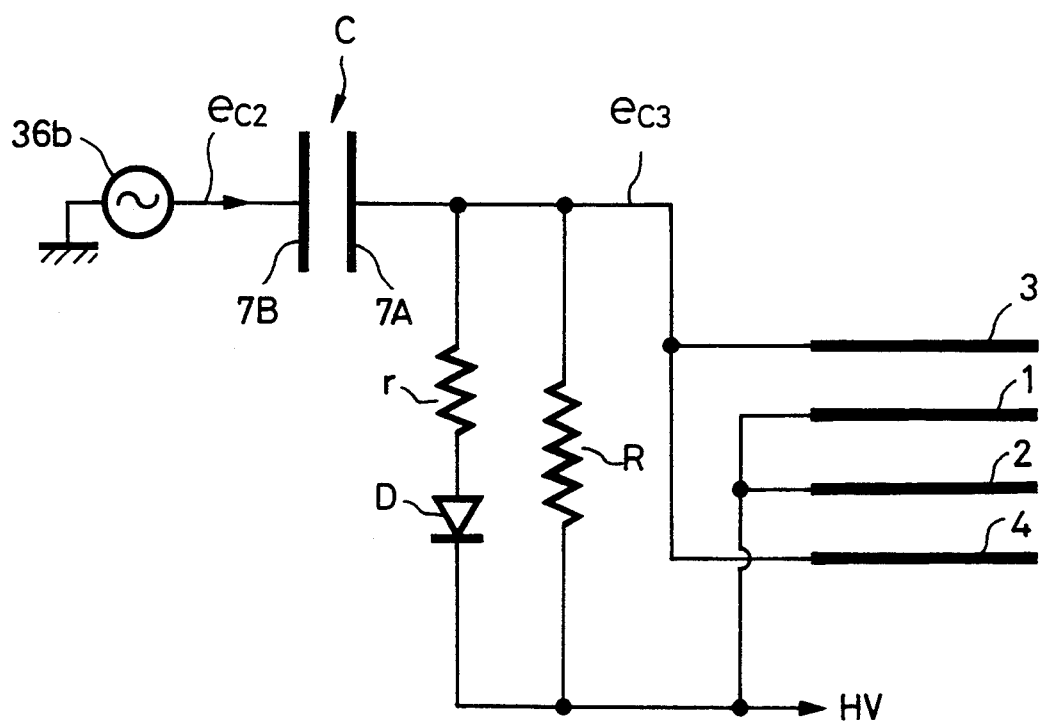
FIG. 5 is a circuit diagram showing an equivalent circuit of the first embodiment shown in FIG. 4.

FIG. 4 shows an arrangement of a first embodiment of a color CRT according to the present invention. FIG. 5 shows an equivalent circuit of the first embodiment shown in FIG. 4. In the first embodiment, the present invention is applied to a color cathode ray tube of the inline 3-beam type using a shadow mask. In this case, four electrode plates using Trinitron (registered trademark) convergence electrode plates are used instead of parts which are generally referred to as convergence cups. That is, as shown in FIG. 4, a pair of high voltage side electrode plates 1, 2 and a pair of low voltage side electrode plates 3, 4 provided at respective outside of the pair of high voltage side electrode plates in an opposing fashion are disposed on the inside of the tube envelope 6 of the color CRT in the horizontal direction such that a central electron beam (green electron beam) passes between the pair of high voltage side electrode plates 1 and 2 and that respective side electron beams (red and blue electron beams) pass between the pair of high voltage side electrode plates 1, 2 and the pair of low voltage electrode plates 3, 4. The length of each of the electrode plates 1 to 4 in the tube axis Z direction is about 10 mm and a spacing therebetween is about 5 mm.

As shown in FIGS. 4 and 5, a parallel circuit of a high resistance value resistor R having a resistance value of several tens of megohms and a diode D having a reverse withstand voltage of more than about 1 kV is connected between the pair of high voltage side electrode plate 1, 2 and the pair of low voltage side electrode plates 3, 4 such that the cathode of the diode D is connected to the pair of high voltage electrode plates 1 and 2. In this case, the high resistance value resistor R is welded on the low voltage side electrode plate 3. The diode D is attached to the low voltage side electrode plate 4. A protection resistor r is connected to the diode D in series if necessary. In the equivalent circuit shown in FIG. 5, the resistor r includes an inner resistance value of the diode D. When the inner resistance value of the diode D is relatively large, the protection external resistor r need not be connected to the diode D in series. In the embodiment shown in FIG. 4, the external resistor r is not connected to the diode D in series.

As shown in FIG. 4, in the inside of the tube envelope 6, an inside conductive layer (inside carbon) 16 is coated on the inner surface of the envelope 6 from its funnel portion to its neck portion to which there is applied a high voltage DC voltage (anode voltage) HV (e.g., 30 kV) through an anode button (not shown). The pair of high voltage side electrode plates 1, 2 are connected to the inside conductive layer 16 through the resilient conductive member 19.

An insulating gap 16g is provided on a part of the inside conductive layer 16 to separate the inside conductive layer 16 by about 20 to 30 mm of a part of the neck portion side, thereby forming the inside conductive layer 7A. An outside conductive layer 7B is deposited on the outside of the tube envelope 6 in an opposing relation to the inside conductive layer 7A, thereby forming a cylindrical-shaped capacitor C which uses a portion (glass) of the tube envelope 6 between the inside and outside conductive layers 7A, 7B as a dielectric. The low voltage side electrode plates 3, 4 are connected to the inside conductive layer 7A of the capacitor C through a resilient conductor piece 34. Then, the outside conductive layer 7B of the capacitor C is applied with a convergence voltage $e_{c2}$ from a convergence correction voltage signal generating source 36b.

Figure 6A:
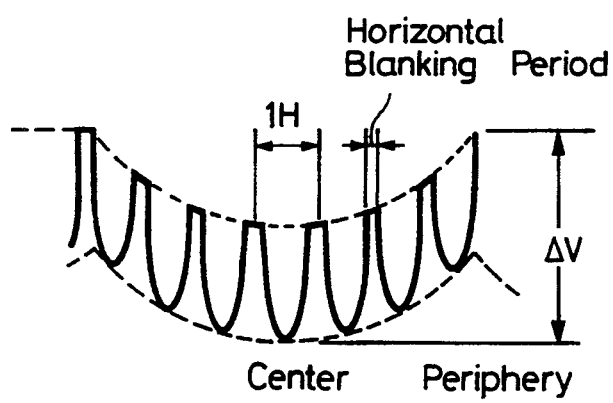
FIG. 6A is a diagram of a waveform of a convergence voltage provided before a clamping pulse is inserted.
Figure 6B:
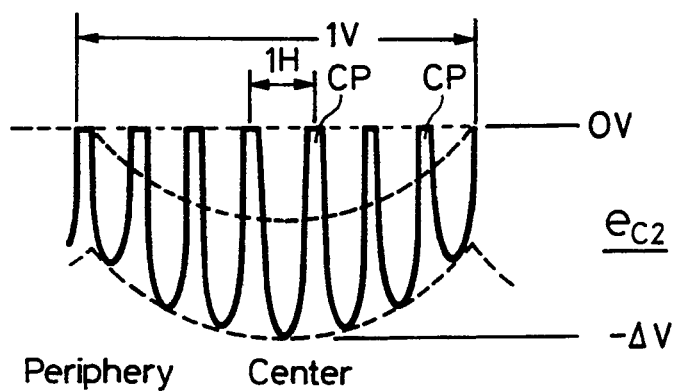
FIG. 6B is a diagram of a waveform of a convergence voltage after a clamping pulse is inserted.

FIG. 6B shows a waveform of the convergence voltage $e_{c2}$. More specifically, as shown in FIG. 6A, the convergence voltage $e_{c2}$ is a voltage that results from adding a vertical parabolic wave voltage to the horizontal retrace interval of a modulated voltage an absolute value $\Delta V$ of the amplitude obtained by amplitude-modulating the DC voltage a little lower than the high voltage DC voltage by the parabolic waves of the horizontal and vertical deflection periods. The level of the convergence voltage $e_{c2}$ is changed in a range from 0V to $-\Delta V$ as shown in FIG. 6B. The waveform of the convergence voltage $e_{c2}$ shown in FIG. 3B is equal to the waveform into which a clamping pulse amplitude modulated by the vertical period waveform is inserted into the horizontal retrace interval of the waveform shown in FIG. 6A. Incidentally, within the vertical retrace interval, the convergence correction is not related to the present invention and hence, the clamping pulse CP may be inserted without causing the disadvantage.

Figure 6C:
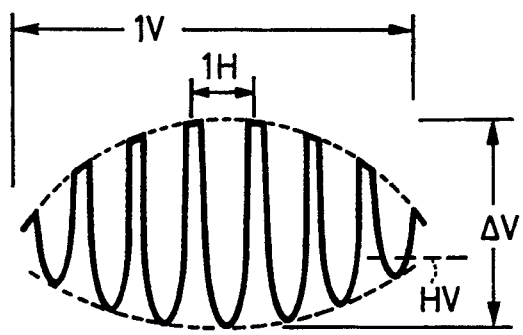
FIG. 6C is a diagram of an AC coupled waveform of the convergence voltage shown in FIG. 6B.
Figure 6D:
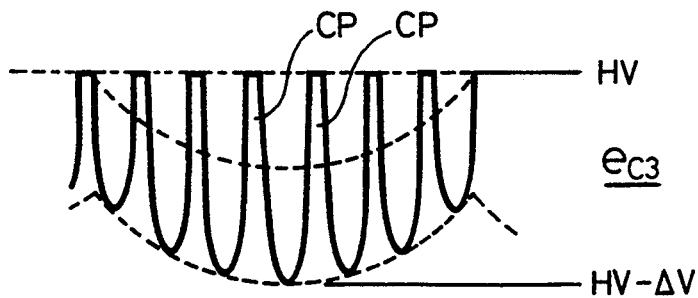
FIG. 6D is a diagram of a waveform and showing the condition that the waveform shown in FIG. 6B is clamped to a high voltage DC voltage.

At that time, if the diode D is not provided, a waveform of the voltage applied to the low voltage side electrode plates 3, 4 becomes a waveform in which voltage components are simply coupled in an AC fashion as shown in FIG. 6C. Therefore, the vertical period component cannot be transmitted with fidelity. However, if the diode D is connected to the high resistance value resistor R in parallel so that the cathode of the diode D is connected to the high voltage side electrode plates 1, 2 as shown in FIG. 5, then a convergence voltage $e_{c3}$ applied to the low voltage side electrode plates 3, 4 is clamped at its peak value of the clamping pulse CP to the high voltage DC voltage HV by the diode D as shown in FIG. 6D. Thus, the portion that is higher than the high voltage DC voltage HV is suppressed and the level lowered to the negative side is changed in a range of from HV to HV-$\Delta V$. As a result, a vertical period component can be transmitted reliably.

The convergence voltage $e_{c2}$ that is applied to the capacitor C may be a voltage coupled in an AC fashion as shown in FIG. 6C. Also in this case, the low voltage side electrode plates 3, 4 are applied with a voltage having a waveform shown in FIG. 6D by the clamping operation of the diode D and the high resistance value resistor R.

The dynamic convergence operation can be carried out reliably by the dynamic convergence apparatus having the arrangement according to the first embodiment. Consequently, a magnetic field of the deflection yoke may be a uniform magnetic field. Hence, it is possible to prevent a focusing at the peripheral portion of the picture screen of the color CRT from being deteriorated by the uniform magnetic field.

Because a potential difference occurs between the high voltage side electrode plates 1, 2 and the low voltage side electrode plates 3, 4 at the center of the picture screen of the color CRT, a static convergence in the electron gun body must be set in consideration of such potential difference like the prior art.

An equivalent circuit according to a second embodiment of the present invention in which the present invention is applied to a Trinitron CRT (Trinitron is a registered trademark) will be described below with reference to FIGS. 7 and 4. The Trinitron CRT is an inline 3-beam type color CRT but it uses an aperture grill instead of a shadow mask. In this case, a pair of opposing high voltage side electrode plates 1, 2 and a pair of low voltage side electrode plates 3, 4 disposed at the respective outside of the pair of high voltage side electrode plates 1, 2 so as to oppose the same for effecting the static convergence on three electron beams are disposed inside of the tube envelope of the color CRT 6 in the horizontal direction such that a central electron beam (green electron beam) passes between the pair of high voltage side electrode plates 1 and 2 and the electron beams (blue and red electron beams) of the respective sides pass between the pair of high voltage side electrode plates 1, 2 and the pair of low voltage side electrode plates 3, 4, respectively.

Figure 7:
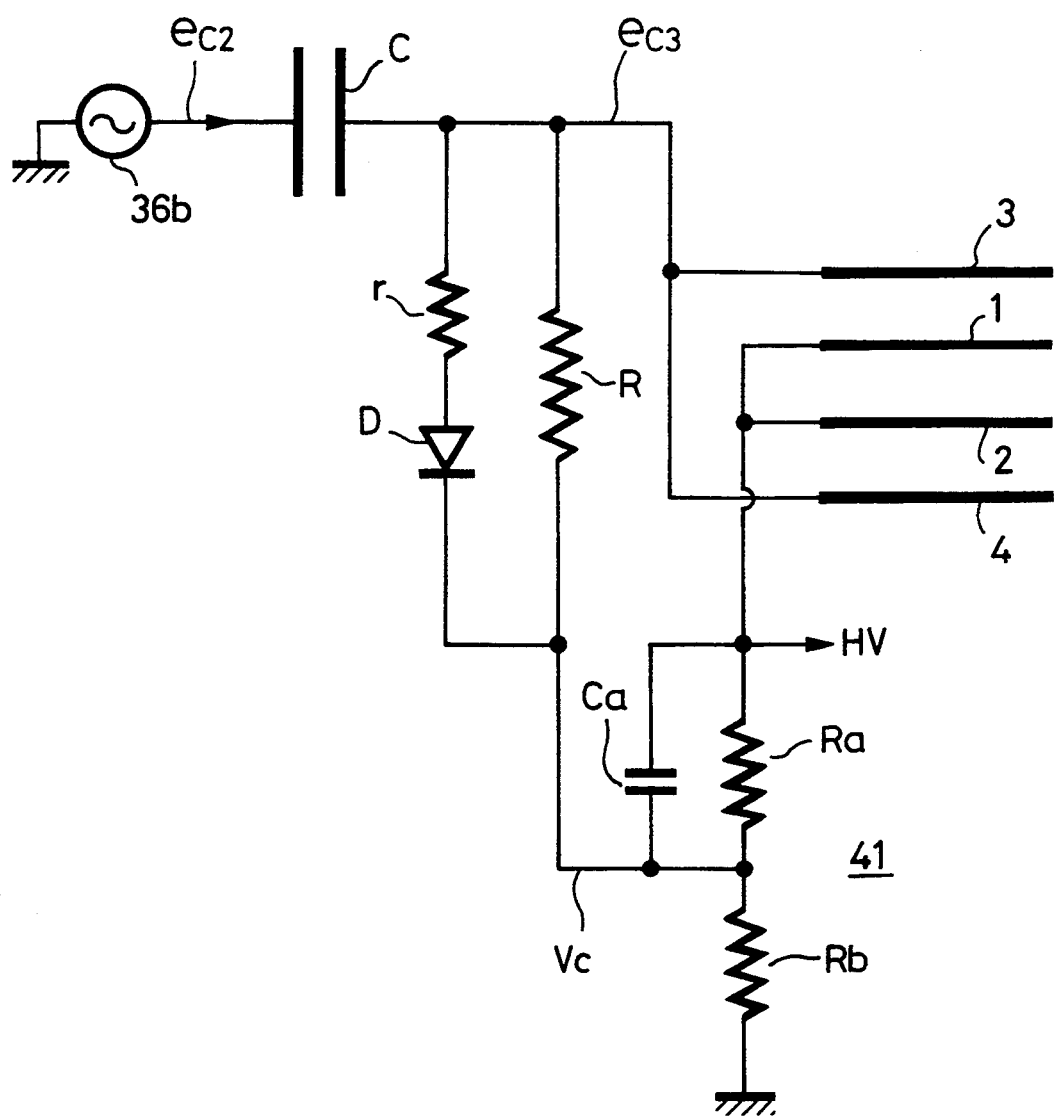
FIG. 7 is a diagram showing an equivalent circuit of a second embodiment of the present invention.

In FIG. 7, one end on an anode side of the diode D, of a parallel circuit of a high resistance value resistor R and a series circuit of diode D and resistor r is connected to the pair of low voltage side electrode plates 3, 4. Similarly to FIG. 4, an inside conductive layer (carbon layer) 16 is deposited on the inside of the tube envelope 6 from the funnel portion to the neck portion. A high voltage DC voltage (anode voltage) HV (e.g., 30 kV) is applied to the inside conductive layer 16 to which there are connected the pair of high voltage side electrode plates 1, 2 through a resilient conductive piece member 19. Unlike FIG. 4, a terminal at which a voltage Vc that results from dividing the high voltage DC voltage HV by a voltage divider 41 formed of a series circuit of resistors (resistor layers) Ra, Rb provided within the tube envelope of the color CRT, i.e., voltage of 29 kV is developed is connected to one end of the cathode side of the diode D of a parallel circuit of a high resistance value resistor R and a series circuit of the diode D and a resistor r. A capacitor Ca is connected in parallel to the resistor Ra provided at the high voltage DC voltage HV side of the voltage divider 41 in order to stabilize the voltage Vc.

Also in the second embodiment shown in FIG. 7, similarly to FIG. 4, the insulating gap 16g is provided at a part of the inside conductive layer 16 so as to separate the layer 16 at neck portion partly by about 20 to 30 mm. Further, an outside conductive layer 7B is deposited on the outside of the tube envelope 6 in an opposing relation to the inside conductive layer 7A thus separated, thereby forming the cylindrical-shaped capacitor C using the portion (glass) of the tube envelope 6 therebetween as a dielectric material. The low voltage side electrode plates 3, 4 are connected through a resilient conductive piece member 34 to the inside conductive layer 7A of the capacitor C. The outside conductive layer 7B of the capacitor C is applied with the convergence voltage $e_{c2}$ from a convergence correction voltage signal generating source 36.

As shown in FIG. 6B, the convergence voltage $e_{c2}$ results from adding a vertical parabolic wave voltage to the horizontal blanking interval of a modulated voltage having an amplitude absolute value ΔV (e.g., 1 kV) which results from amplitude-modulating a DC voltage slightly lower than the high voltage DC voltage HV by a parabolic wave of horizontal and vertical deflection periods as shown in FIG. 6A. The convergence voltage $e_{c2}$ changes its level between 0 V and −ΔV as shown in FIG. 6B.

Because the static convergence and the dynamic convergence can be carried out by the dynamic convergence apparatus thus arranged according to the second embodiment of the present invention, the magnetic field of the deflection yoke become sufficient in uniform magnetic field and it is possible to avoid a focusing from being deteriorated at the periphery of the picture screen of the color CRT due to the uniform magnetic field.

While the convergence voltage $e_{c2}$ from the convergence correction voltage signal generating source 36b is supplied through the capacitor C to the pair of low voltage side electrode plates 3, 4 to thereby apply the convergence voltage $e_{c3}$ to the pair of low voltage side electrode plates 3, 4 as described in the first and second embodiments shown in FIGS. 4 and 7, the present invention is not limited thereto and such a variant is also possible. That is to say, as shown in an equivalent circuit according to a third embodiment shown in FIG. 8, different convergence voltages $e_{c4}$, $e_{c5}$ from convergence correction voltage signal generating sources 36c, 36d are respectively supplied through capacitors $C_1$, $C_2$ to the pair of low voltage side electrode plates 3, 4 to thereby apply different convergence voltages $e_{c6}$, $e_{c7}$ to the pair of low voltage side electrode plates 3, 4. In this case, the capacitor C used in the first embodiment shown in FIGS. 4 and 5 is halved in the vertical direction to provide the independent capacitors $C_1$, $C_2$. Then, there are provided a parallel circuit of a diode $D_1$ and a high resistance value resistor $R_1$ and a parallel circuit of a diode $D_2$ and a high resistance value resistor $R_2$. A junction between the cathodes of the diodes $D_1$ and $D_2$ is commonly connected to the pair of high voltage side electrode plates 1, 2 and respective anodes of the diodes $D_1$, $D_2$ are connected to the pair of low voltage side electrode plates 3, 4, respectively, whereby the dynamic convergence can be respectively effected on electron beams of respective sides for the central electron beams, i.e., red and blue electron beams. In this case, a protecting resistor may be connected in series to each of the diode $D_1$, $D_2$.

Figure 8:
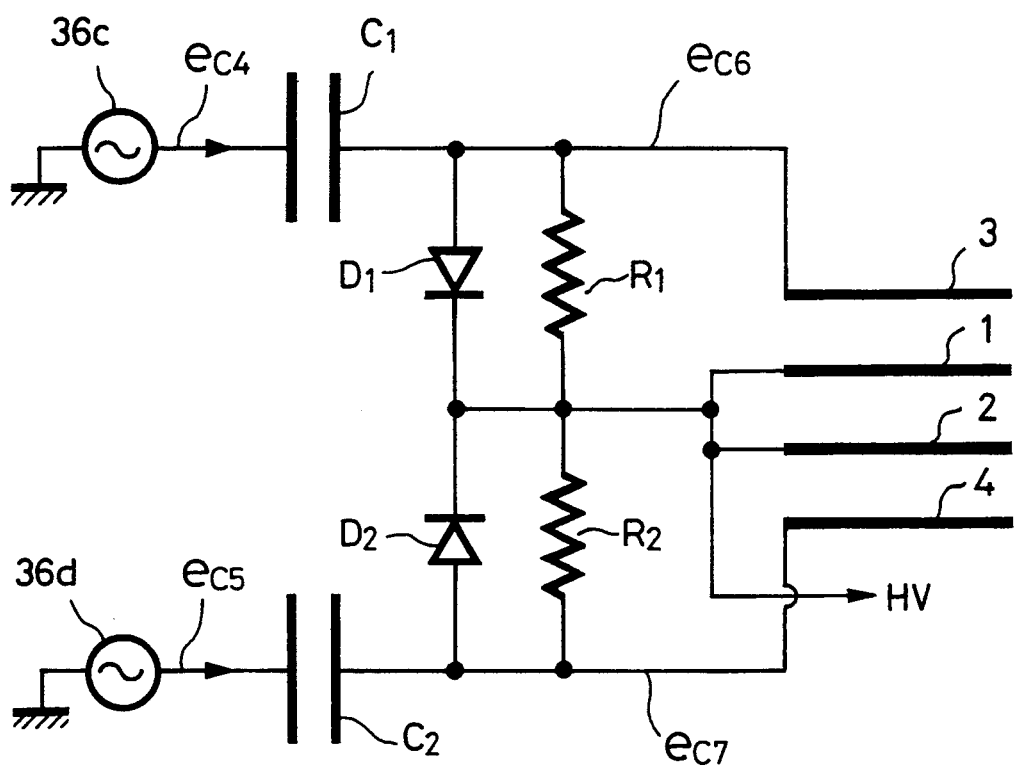
FIG. 8 is a diagram showing an equivalent circuit of a third embodiment of the present invention.

When the third embodiment shown in FIG. 8 and the second embodiment shown in FIG. 7 are combined, the junction between the cathodes of the respective diodes $D_1$, $D_2$ in the parallel circuit of the diode $D_1$ and the high resistance value resistor $R_1$ and the parallel circuit of the diode $D_2$ and the high resistance value resistor $R_2$ is not connected to the pair of high voltage side electrode plates 1, 2 but such junction is connected to the terminal at which there is developed the voltage Vc which results from dividing the high voltage DC voltage HV shown in FIG. 7 by the voltage divider 41 formed of the series circuit of the resistors (resistor layers) Ra, Rb and the capacitor Ca provided within the tube envelope of the color CRT, e.g., 29 kV.

Figure 9:
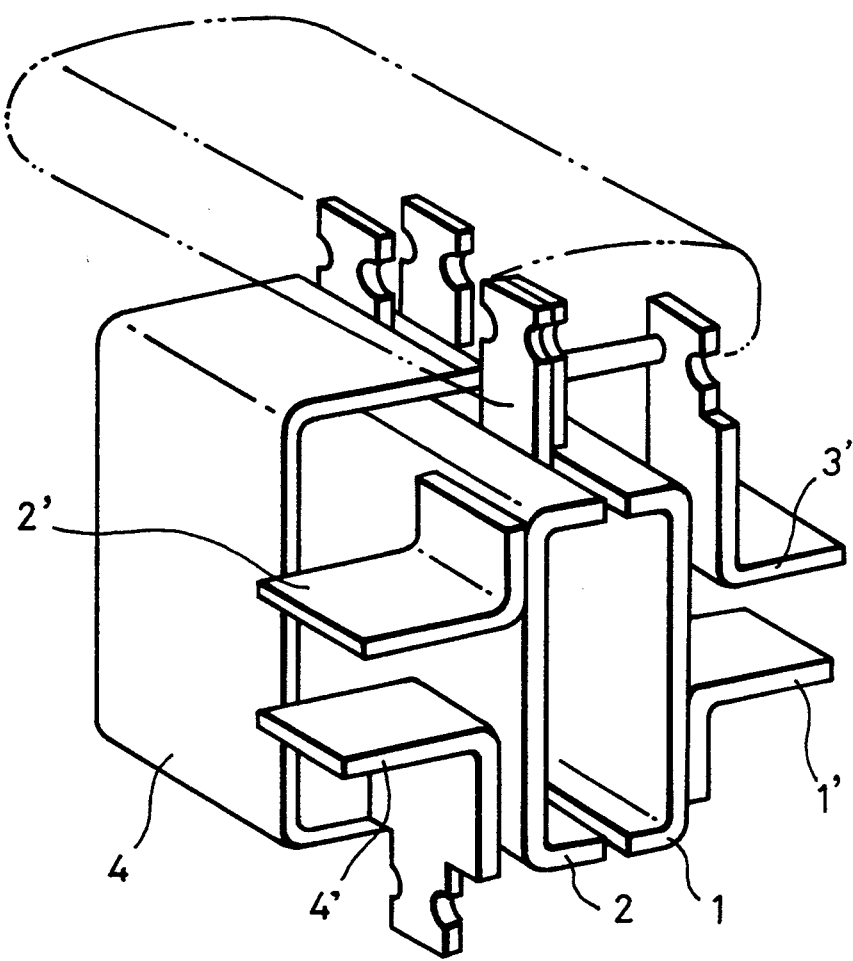
FIG. 9 is a fragmentary perspective view showing a color CRT according to a fourth embodiment of the present invention.

A fourth embodiment of the present invention will hereinafter be described with reference to FIG. 9. As shown in FIG. 9, in addition to the above-mentioned electrode plates 1 to 4, opposing high voltage side electrode plate 1' and low voltage side electrode plate 3' are disposed in the inside of the tube envelope in the vertical direction such that one of the electron beams of the respective side passes between the high voltage side electrode plate 1' and the low voltage side electrode plate 3'. Also, opposing low voltage side electrode plate 4' and high voltage side electrode plate 2' are disposed in the inside of the tube envelope in the vertical direction such that the other of the electron beams of the respective sides passes between the low voltage side electrode plate 4' and the high voltage side electrode plate 2'. Then, the voltage is supplied to the electrode plates 1 to 4, the pair of high voltage side electrode plates 1', 2' and the pair of resistors 3, 4 by using the circuits of the above-mentioned first to third embodiments or combinations of such circuits. With the above-mentioned arrangement, not only a misconvergence in the horizontal direction but also a misconvergence in the vertical direction can be corrected. When this embodiment is applied to the trinitron type CRT, a static convergence is effected on the pair of high voltage side electrode plates 1, 2 and the pair of low voltage side electrode plates 3, 4 but a static convergence is not effected on the pair of high voltage side electrode plates 1', 2' and the pair of low voltage side electrode plates 3', 4'.

Figure 10A:
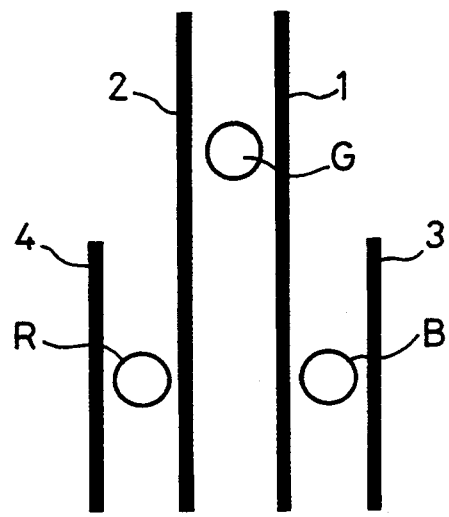
FIG. 10A is a diagram showing the arrangement of electrodes according to a fifth embodiment of the present invention.
Figure 10B:
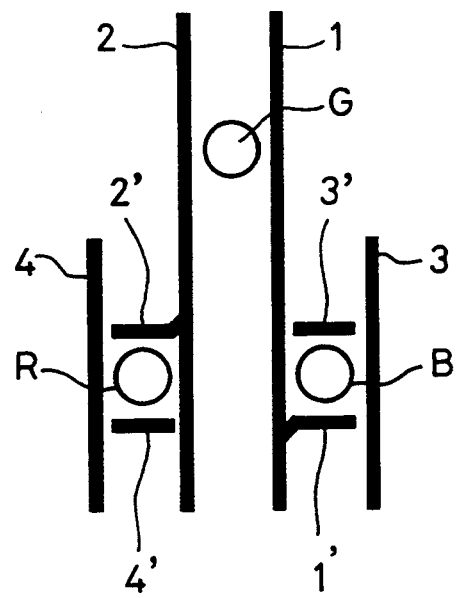
FIG. 10B is a diagram showing the arrangement of electrodes according to a sixth embodiment of the present invention.

While the color CRT in which the three electron beams R, G and B are set to the inline position in the horizontal direction as has been described so far, the present invention is not limited thereto and may be applied to a color CRT in which the three electron beams R, G and B are placed in a so-called Δ position. FIGS. 10A and 10B show fifth and sixth embodiments of the present invention in that case. In the fifth embodiment, there are provided the pair of high voltage side electrode plates 1, 2 and the pair of low voltage side electrode plates 3, 4. In the sixth embodiment, there are provided two pairs of high voltage side electrode plates 1, 2, 1', 2' and two pairs of low voltage side electrode plates 3, 4, 3', 4'. Both in the fifth and sixth embodiments, the heights of the pair of high voltage side electrode plates 1, 2 are longer than those of the above-mentioned first, second, third and fourth embodiments. The circuit for supplying the voltage to the respective electrode plates is the same as those of the above embodiments or the combinations thereof.

A seventh embodiment of the present invention will be described below with reference to FIGS. 11A to 11C. In this embodiment, it is intended to avoid that, upon high voltage aging, i.e., knocking, a current is flowed from the pair of high voltage side electrode plates to the pair of low voltage side electrode plates and this current becomes a reverse current to the diode to damage the diode. FIG. 11C shows the seventh embodiment of the present invention and FIGS. 11A, 11B will be described prior to FIG. 11C.

Figure 11A:
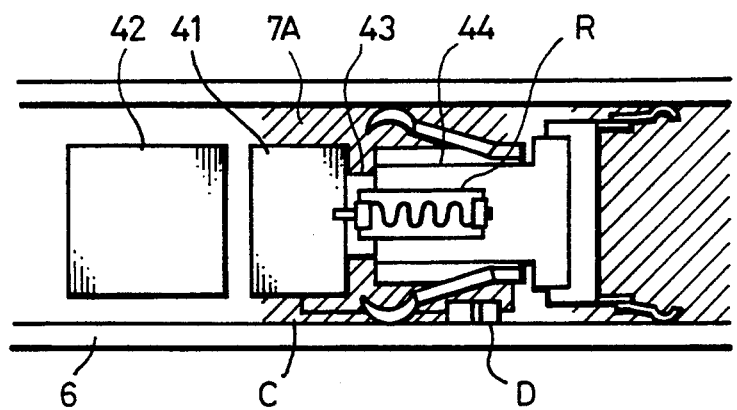
FIG. 11A is a diagram showing a part of the color CRT, and to which references will be made in explaining how the diode is damaged.

FIG. 11A shows a part of the above-mentioned embodiments within the tube envelope 6 of the color CRT. In FIG. 11A, reference symbol D designates a diode, C a capacitor, 7A an inside conductive layer constructing the capacitor C and R a high resistance value resistor. Reference numeral 41 designates a high voltage electrode (anode, etc.), 42 its adjacent electrode, 43 a shield electrode (high voltage side electrode plate) and 44 a C plate electrode (low voltage side electrode plate). The C plate electrode (low voltage side electrode plate) 44 is adapted to effect the static convergence on the central electron beam and the side electron beams in the trinitron type electron gun and is held at low voltage relative to a high voltage DC voltage of the electron gun. The C shield electrode 43 (high voltage side electrode plate) is adapted to effect the static convergence on the central electron beam and the side beams in the trinitron type electron gun and is held at high voltage relative to the C plate electrode 44.

As shown in FIG. 11A, upon knocking, the high voltage electrode 41 is grounded and a negative voltage is applied to other electrodes. A maximum applied voltage in the knocking process falls in a range of from −50 to −60 kV. At that time, a discharge occurs among the electrode 42 adjoining the high voltage electrode 41, the high voltage electrode 41 and the inside conductive layer (inside carbon layer) 7A of the capacitor C. When the discharge occurs between the inside conductive layer 7A of the capacitor C and the electrode 42, there is produced a path of a current flowing from the high voltage C shield electrode 43 to the C plate electrode 44 so that a reverse current is flowed to the diode D to damage the same.

Figure 11B:
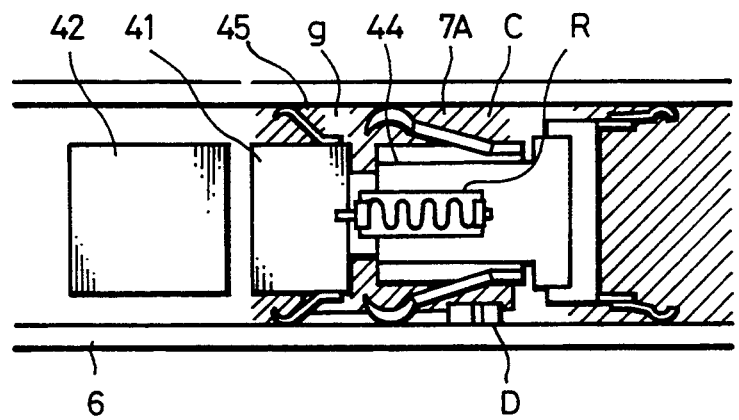
FIG. 11B is a diagram showing a part of the color CRT, and to which references will be made in explaining how to avoid the diode from being damaged and how a gap is charged.
Figure 11C:
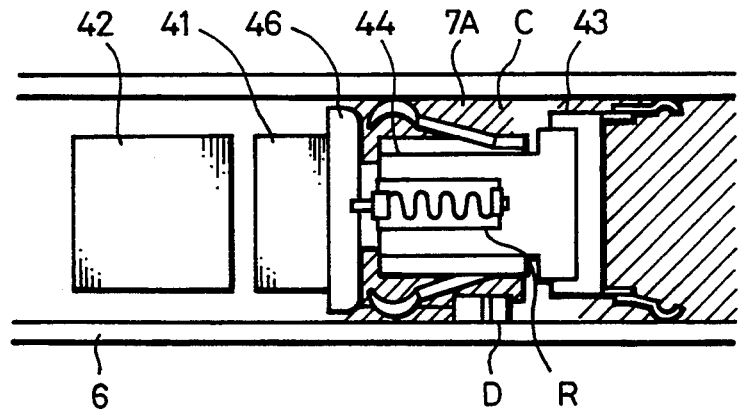
FIG. 11C is a diagram showing a part of the color CRT according to a seventh embodiment of the present invention, and to which references will be made in explaining how to avoid the diode from being damaged by providing a shield electrode.

In order to avoid the diode D from being damaged, as shown in FIG. 11B, the inside conductive layer 7A constructing the capacitor C is separated from an inside conductive layer 45 connected with the high voltage electrode 41 and a gap g made of an insulating material is provided between the inside conductive layers 7A and 45, thereby avoiding the reverse current from being flowed to the diode D. However, there is then the drawback such that a bad influence is exerted upon the electron beam by the charge on the gap g.

Therefore, as shown in FIG. 11C, a circular cap-shaped shield electrode 46 that is close to the inner wall of the neck portion of the tube envelope 6 is provided between the high voltage electrode 41 and the C plate electrode (low voltage side electrode plate) 44. FIGS. 12A through 12D are a plan view, a longitudinal cross-sectional view, a bottom view and a transversal cross-sectional view of the shield electrode 46, respectively. The shield electrode 46 has at its center bored a slit 46a through which three electron beams of incline arrangement are permitted to pass. The shield electrode 46 is not connected to other electrodes such as the high voltage electrode 41 or the like. By this shield electrode 46, the diode D can be avoided from being damaged due to the discharge upon knocking. Also, if an index is attached to the shield electrode 46 in advance, when the electron gun is assembled, the high voltage electrode 41 and the C plate electrode (low voltage side electrode plate) 44 can be prevented from being displaced in axis relative to the shield electrode 46.

A correction of the dynamic convergence by the dynamic convergence apparatus of the embodiment represented by the equivalent circuit shown in FIG. 5 functions effectively when the high voltage DC voltage HV supplied through the anode button is not changed rapidly, in other words, when the high voltage DC voltage HV is constant or is changed gently.

However, when the high voltage DC voltage HV is not stabilized like a consumer color television receiver, for example, the high voltage DC voltage HV is suddenly changed depending on the kinds of video signals received and reproduced on the picture screen so that a state that the peak value of the clamping pulse CP shown in FIG. 6 is not clamped to the high voltage DC voltage HV, i.e., so-called clamping disabled period occurs. There is then the problem that a convergence error occurs during this period.

This problem will be described more fully and embodiments that can solve such problem will be described.

Figure 13:
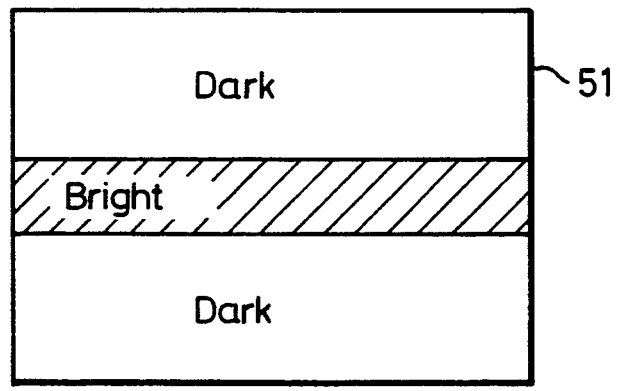
FIG. 13 is a schematic diagram showing a picture screen, and to which references will be made in explaining the occurrence of a convergence error.

In order to understand this problem more clearly, FIG. 13 shows a picture screen 51 on which a video signal is received and reproduced. The picture on the picture screen 51 is a stripe-shaped picture pattern in which upper and lower portions of the picture are "dark" and a central portion of a picture intermediate between the upper and lower portions of the picture is "bright".

Figure 14:
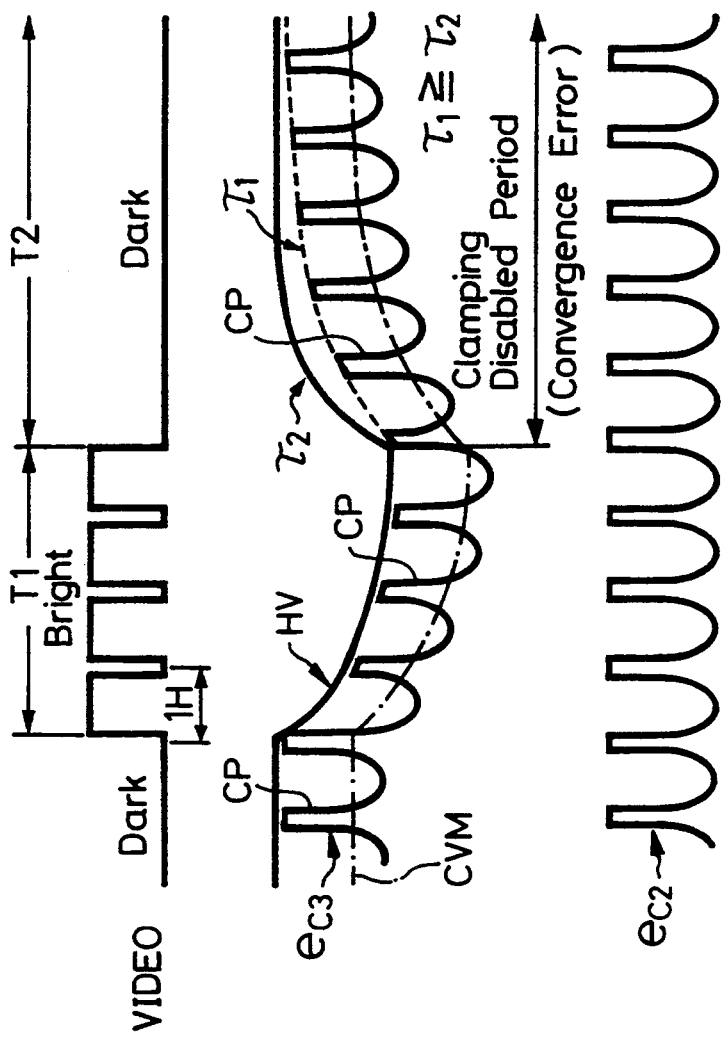
FIG. 14A is a diagram of a waveform of a video signal corresponding to a video pattern shown in FIG. 13.
FIG. 14B is a diagram of waveforms used to explain the convergence error.
FIG. 14C is a diagram of a waveform of a convergence voltage.

FIG. 14A is a diagram showing a waveform of a video signal VIDEO corresponding to a video pattern of such picture screen 51. As shown in FIG. 14A, the level of the video signal VIDEO is at low level in the portion where the picture is "dark" and at high level in the portion where the picture is "bright". A waveform of an anode current flowing through the anode button become similar to this waveform of the video signal VIDEO, though not shown.

FIG. 14B is a diagram showing a waveform of the high voltage DC voltage HV that changes in response to the video signal VIDEO and a waveform of the convergence voltage $e_{c3}$ in which the peak value of the clamping pulse is clamped to the high voltage DC voltage HV. A one-dot chain line in FIG. 14B shows the state that an average voltage CVM of the convergence voltage $e_{c3}$ is being changed.

FIG. 14C shows a waveform of a part of the convergence voltage (convergence correction voltage) $e_{c2}$ output from the convergence correction voltage signal generating source 36b.

Figure 15:
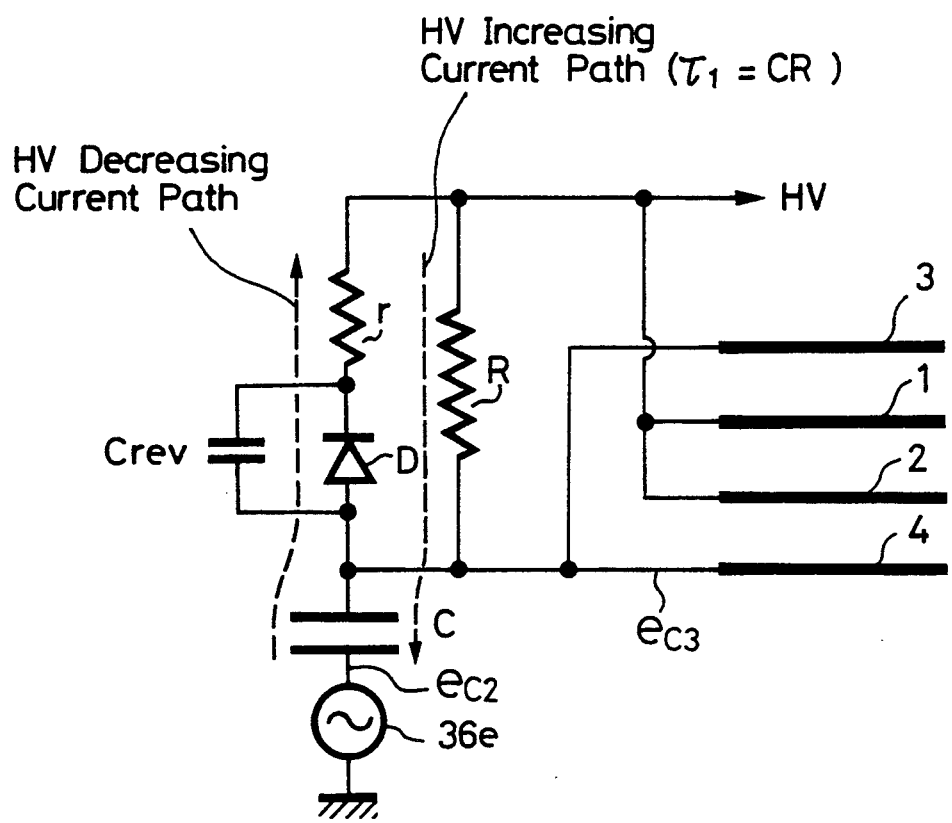
FIG. 15 is a circuit diagram used to explain the occurrence of the convergence error.

FIG. 15 is a circuit diagram used to explain the waveforms shown in FIGS. 14A to 14C. During a period T1 in which the high voltage DC voltage HV is lowered after the picture on the picture screen 51 had been changed from "dark" state on the upper portion of the picture screen to the "bright" state on the central portion of the picture screen, the diode D is biased in the forward direction, whereby a discharging current is flowed from the capacitor C to the high voltage DC voltage HV through a current path when the high voltage DC voltage HV of low impedance is lowered as shown in FIG. 15. As a consequence, the convergence voltage $e_{c3}$ is changed while the peak value of the clamping pulse CP is clamped to the high voltage DC voltage HV. Therefore, the voltages of the low voltage side electrode plates 3 and 4, i.e., the average voltage CVM of the convergence voltage $e_{c3}$ is changed following the change of the high voltage DC voltage HV, thereby preventing a convergence error from taking place during the lowering period T1 of the high voltage DC voltage HV.

During a period T2 in which the high voltage DC voltage HV is raised after the picture on the picture screen 51 has been changed again from the "bright" state on the central portion of the picture screen to the "dark" state on the lower portion of the picture screen, the diode D is biased in the reverse direction so that, when the high voltage DC voltage HV is raised, a charging current is flowed through the high resistance value resistor R to the capacitor C.

Assuming that $\tau_1$ is a time constant, then we have:

$$\tau = C \cdot R$$

Here, the voltage change during the period in which the high voltage DC voltage HV is raised (raising period T2) is approximated by exponential function and a time constant thereof is set to $\tau_2$. Then, in order to prevent a convergence error from taking place during the raising period T2 of the high voltage DC voltage, we must have:

$$\tau_1 < \tau_2$$

In actual practice, however, in order to increase a waveform transmission efficiency of the convergence voltage $e_{c3}$ supplied from the outside of the color CRT, a resistance value of the high resistance value resistor R is selected to be a large value ranging from, for example, 10 MΩ to 100 MΩ.

Therefore, it is proposed to reduce the time constant $\tau_1$ by reducing the capacitance value of the capacitor C. However, a reverse-direction capacitor Crev shown in FIG. 15 is connected to the diode D in parallel when the diode D is biased in the reverse direction with the result that the convergence voltage $e_{c2}$ supplied from the outside of the color CRT is divided by the capacitor C and the reverse-direction capacitor Crev, thereby the convergence correction effect being changed. For this reason, the capacitance value of the capacitor C cannot be selected to be so small.

There is a limit in reducing the time constant $\tau_1$ and $\tau_1 \geq \tau_2$ is actually established. Therefore, as shown by the waveform of the convergence voltage $e_{c3}$ provided during the raising period T2 of the high voltage DC voltage HV in FIG. 14B, the peak value of the clamping pulse CP, i.e., the peak value of the convergence voltage $e_{c3}$ cannot be clamped to the high voltage DC voltage HV, and the follow-up property of the convergence voltage $e_{c3}$ relative to the high voltage DC voltage HV is deteriorated during the clamping disabled period, thereby causing a convergence error to occur.

Figure 16A:
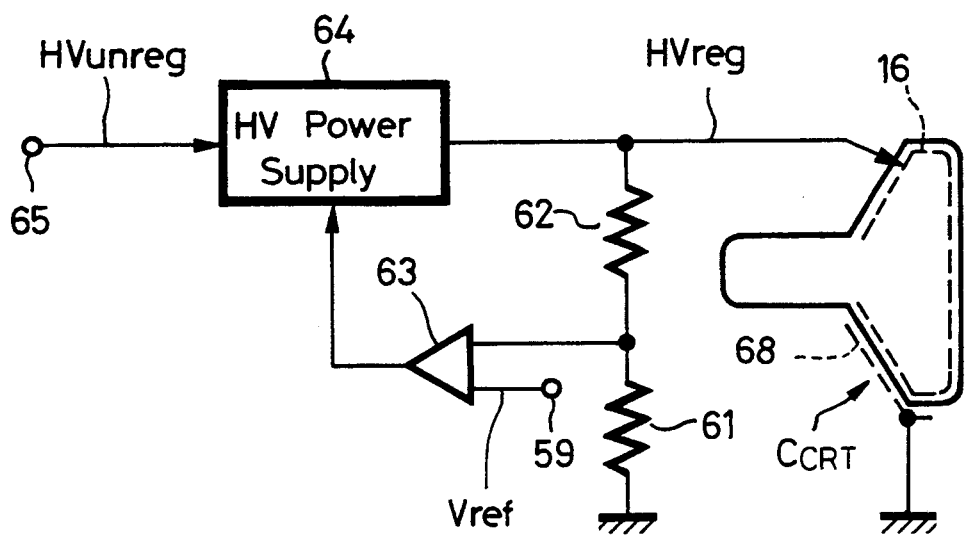
FIG. 16A is a circuit diagram showing an example of how the high voltage DC voltage is stabilized.
Figure 16B:
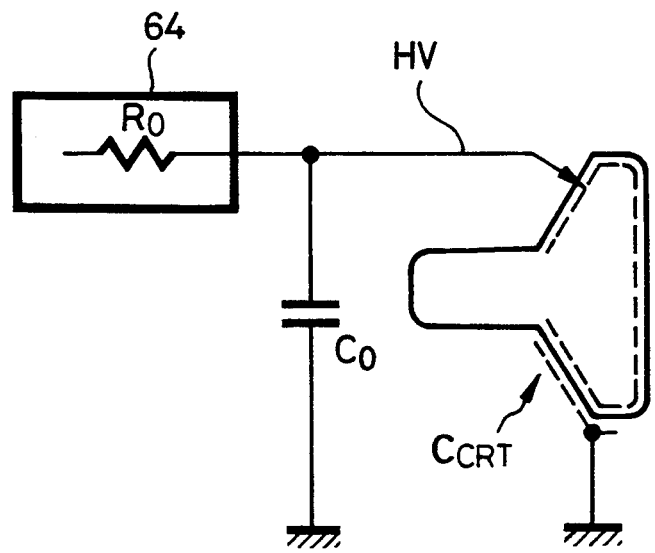
FIG. 16B is a circuit diagram showing another example of how the high voltage DC voltage is stabilized.

FIGS. 16A and 16B are circuit diagrams used to explain techniques for solving the aforesaid problem, i.e., techniques by which the high voltage DC voltage HV can be prevented from being changed and by which the high voltage DC voltage HV is allowed to change slowly even if it is changed (time constant $\tau_2$ is selected to be larger than the time constant $\tau_1$).

In the circuit shown in FIG. 16A, a high voltage DC voltage HVreg from a high voltage power supply 64 is divided by resistors 61, 62. A divided voltage is compared with a reference voltage Vref applied from a terminal 59 by a comparator 63, and a compared output from the comparator 63 is supplied to a control terminal of the high voltage power supply 64.

With the above-mentioned circuit arrangement, the high voltage DC voltage HVunreg that is not stable and supplied to the terminal 65, can be changed to the stabilized high voltage DC voltage HVreg and supplied through the anode button of the color CRT to the inside conductive layer 16. The output impedance of the high voltage power supply 64 can be reduced as described above so that, even when the anode current of the color CRT is fluctuated due to the supply of the video signal VIDEO shown in FIG. 14A, the high voltage DC voltage HVreg applied to the high voltage side electrode plates 1, 2, accordingly, the cathode of the diode D can be prevented from being fluctuated. Consequently, the peak value of the clamping pulse CP can be clamped to the high voltage DC voltage HVreg at least from a theoretical standpoint.

In FIG. 16A, reference symbol $C_{crt}$ designates a capacitor (coating capacitance 40) provided between the inside conductive layer 16 and the outside conductive layer (outside carbon layer) 68 coated on the funnel portion of the color CRT. The inside conductive layer 16 is supplied with the high voltage DC voltage HVreg from the HV power supply 64 through the anode button, and the outside conductive layer 68 is grounded.

In the circuit shown in FIG. 16B, a new capacitor $C_0$ is additionally provided at the output side of the HV power supply 64, i.e., between the high voltage DC voltage HV and the ground. In this case, a capacitance value of the capacitor $C_0$ is increased until the time constant $\tau_2$ $\{\tau_2 = R_0 \cdot (C_0 + C_{CRT})\}$ is expressed as $\tau_2 \geq \tau_1$. With this arrangement, a cut-off frequency of a low-pass filter constructed by the output impedance $R_0$ of the high voltage power supply 64 and the capacitor $(C_0 + C_{CRT})$ is lowered and the fluctuation of the high voltage DC voltage HV can be reduced to the extent that a clamping disabled period is not produced.

As described above, the occurrence of convergence error can be suppressed by the techniques shown in FIGS. 16A, 16B. The technique shown in FIG. 16A still encounters the new problem. That is to say, some suitable assembly parts such as transistors for a series regulator and so on become indispensable to forming the high voltage power supply 64 and also some suitable assembly parts such as high withstand voltage transistors or the like must be used. Therefore the production of consumer color television receiver sets is unavoidably very expensively.

According to the technique shown in FIG. 16B, the external capacitor $C_0$ that is required to be several 1000s of picofarads is expensive and it is unavoidable that a similar problem occurs. Furthermore, in the circuit shown in FIG. 16A, it is impossible to make the output impedance of the high voltage power supply 64 become zero. Consequently, the convergence error cannot be removed completely by the circuit arrangement shown in FIG. 16A.

Figure 17A:
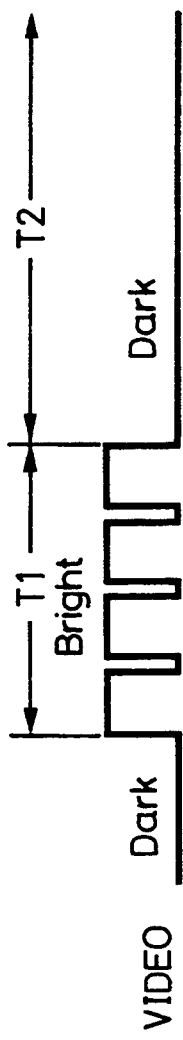
FIG. 17A is a diagram of a waveform showing again the waveform of FIG. 14A.
Figure 17B:
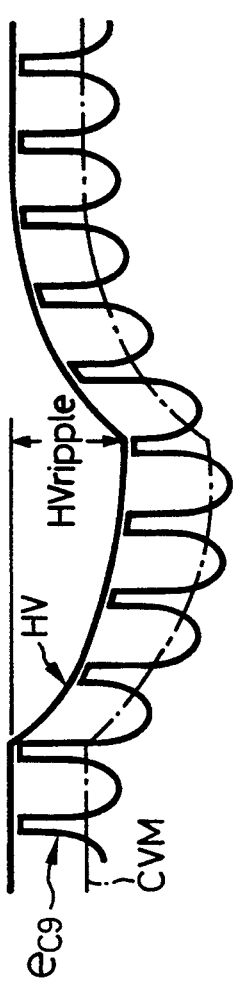
FIG. 17B is a diagram of a waveform of a convergence voltage in the low voltage electrode plate after the convergence error was corrected.
Figure 17C:
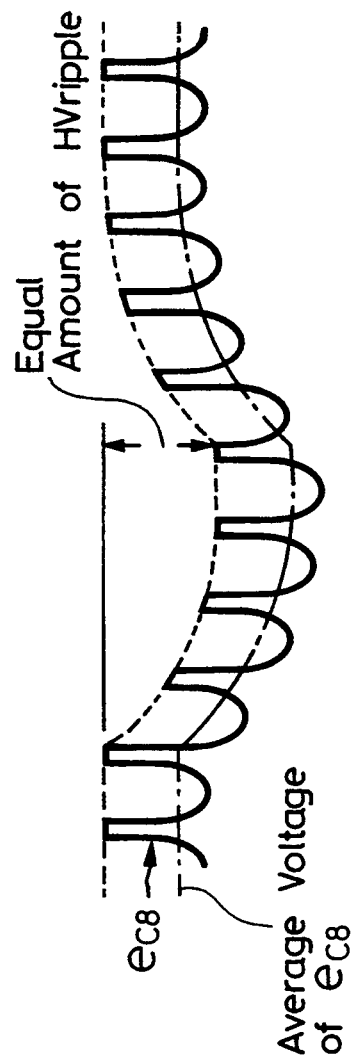
FIG. 17C is a diagram of a waveform of the convergence voltage supplied to a capacitor after the convergence error was corrected.

FIGS. 17A, 17B and 17C are diagrams of waveforms showing a theory of a technique that is applied to the following embodiments of the invention in order to remove the convergence error. One of the most important factors of the technique for removing the convergence error from a theory standpoint is to avoid the occurrence of charge and discharge across the capacitor C. To avoid the occurrence of charge and discharge across the capacitor C, it is sufficient that a voltage whose waveform (amplitude) is the same as that of a ripple (hereinafter referred to as a high voltage DC ripple) HVripple (see FIG. 17B) of the high voltage DC voltage HV that is supplied to the high voltage side electrode plates 1, 2 when the brightness of the video signal VIDEO (see FIG. 17A) is changed is superimposed upon the supply side (outside conductive layer 7B side) of the convergence voltage $e_{c2}$ of the capacitor C.

FIG. 17C shows a waveform of a convergence voltage $e_{c8}$ upon which there is superimposed a voltage fluctuation of the same amount as that of the high voltage DC voltage ripple HVripple. FIG. 17B shows a waveform of a convergence voltage $e_{c9}$ which is formed in such a manner that the convergence voltage $e_{c8}$ is supplied through the capacitor C to the low voltage side electrode plates 3, 4. With the above-mentioned structure, the average voltage CVM of the convergence voltage $e_{c9}$ can accurately follow the change of the high voltage DC voltage HV. Therefore, the clamping operation by the diode D and the capacitor C can be compensated for over the whole period including the lower period T1 and the raising period T2 of the high voltage DC voltage HV, thereby avoiding the occurrence of the convergence error.

Circuit arrangements of the embodiments based on the theory shown in FIGS. 17B, 17C will be described below.

Figure 18:
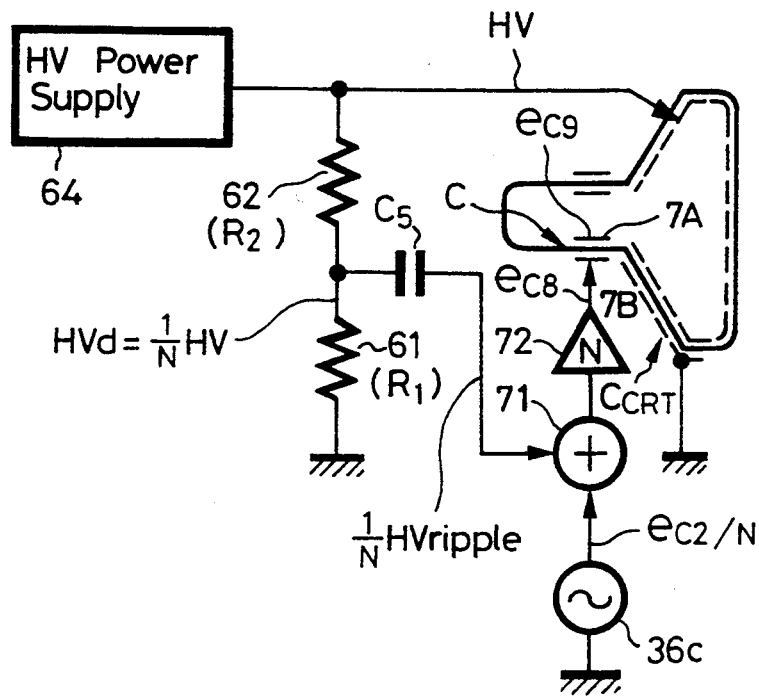
FIG. 18 is a circuit diagram showing an eighth embodiment of the present invention to which there is applied a resistance dividing system ripple detecting/superimposing technique.

FIG. 18 shows an example (eighth embodiment) of a resistance dividing system ripple detecting/superimposing technique. In this embodiment shown in FIG. 18, assuming now that $R_1$ (e.g., several 100 s of K$\Omega$s) and $R_2$ (e.g., several 100 s of M$\Omega$s) represent resistance values of resistors 61 and 62, then a voltage HVd which results from dividing the high voltage DC voltage HV by the resistors 61, 62 is expressed by the following equation (1):

$$HVd = HV \cdot 1/N = HV \cdot R_1/(R_1 + R_2) \tag{1}$$

where 1/N (N is about 1000) is the voltage dividing ratio.

As shown in FIG. 18, this divided voltage HVd is coupled by a capacitor $C_5$ in an AC fashion and then supplied to one input terminal of an adder 71. In this case, the adder 71 is supplied at one input terminal thereof with a signal that is 1/N times the high voltage DC voltage ripple HVripple which is the voltage-divided ripple from which an unnecessary DC component is removed. A convergence voltage $e_{c2}/N$ is supplied to the other input terminal of the adder 71 from a convergence voltage correction signal generating source 36c. Consequently, at the output terminal of the adder 71 is developed a signal that is expressed by the following equation (2):

$$(HVripple + e_{c2})/N \tag{2}$$

The convergence voltage $e_{c8}$ which results from amplifying the signal expressed by the equation (2) by an amplifier 72 having an amplification degree of N times (see FIG. 17C) is supplied to one end side of the capacitor C, i.e., the outside conductive layer 7B (see FIG. 4), whereby the convergence voltage $e_{c9}$ which is free from the occurrence of convergence error as shown in FIG. 17B is supplied to the low voltage side electrode plates 3, 4 (inside conductive layer 7A) of the color CRT.

Figure 19:
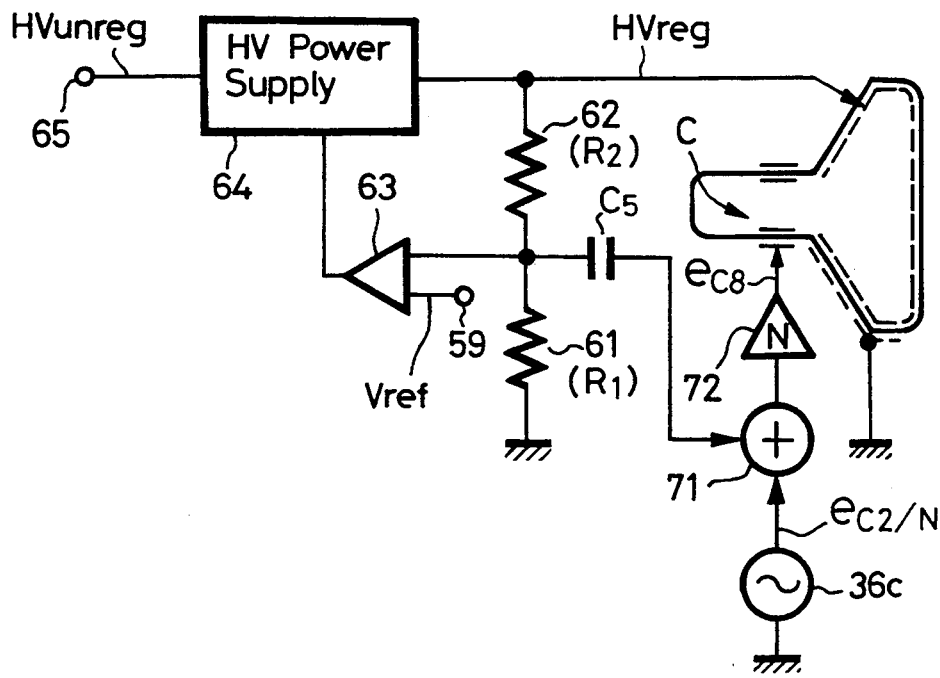
FIG. 19 is a circuit diagram showing a ninth embodiment of the present invention to which there is applied a resistance dividing system ripple detecting/superimposing technique.

FIG. 19 shows another example (ninth embodiment) of a resistance dividing system ripple detecting/superimposing technique. The ninth embodiment shown in FIG. 19 includes a circuit arrangement that is formed by the combination of the embodiment shown in FIG. 16A and the embodiment shown in FIG. 18. That is to say, in the ninth embodiment shown in FIG. 19, a circuit that includes the coupling capacitor $C_5$, the adder 71, the convergence voltage correction signal generating source 36c and the amplifier 72 is added to a color CRT circuit including an existing regulated power supply shown in FIG. 16A.

According to the ninth embodiment of FIG. 19, it is frequently observed that, even when the high voltage DC voltage HV is stabilized in a DC fashion, an excess control characteristic (high frequency characteristic) is not sufficient. Therefore, even when there occurs a small amount of the high voltage DC voltage ripple relative to the sudden change of the anode current of the color CRT, the occurrence of convergence error can be avoided by the application of the resistance dividing system ripple detecting/superimposing technique. According to the ninth embodiment shown in FIG. 19, the convergence error can be improved more as compared with the eighth embodiment shown in FIG. 18.

In the eighth and ninth embodiments shown in FIGS. 18 and 19, the resistance type potential divider is used as the voltage divider. In this case, the resistor 62 needs a withstand voltage of about 30 kV or more and such resistor 62 is large in size and expensive. Even when the resistance type potential divider is replaced with a series circuit of a plurality of resistors, there is then the problem that such series circuit needs a large space for mounting.

A further example that the resistance type potential divider is replaced with a capacitor type voltage divider as the voltage divider will be described next.

Figure 20A:
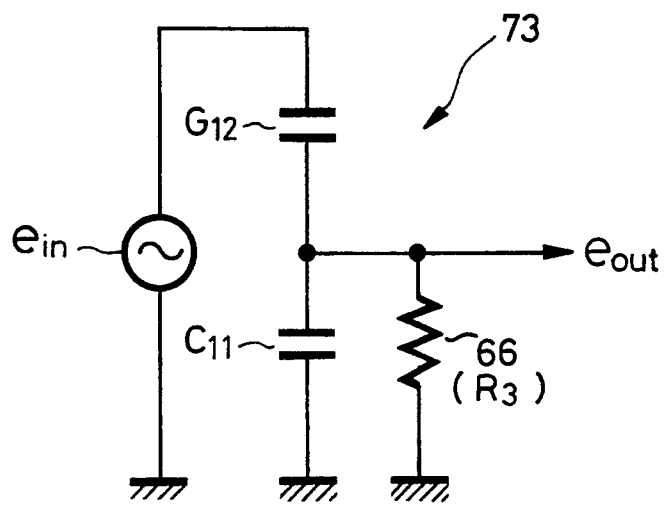
FIG. 20A is a diagram showing a circuit arrangement of a capacitor type voltage divider.
Figure 20B:
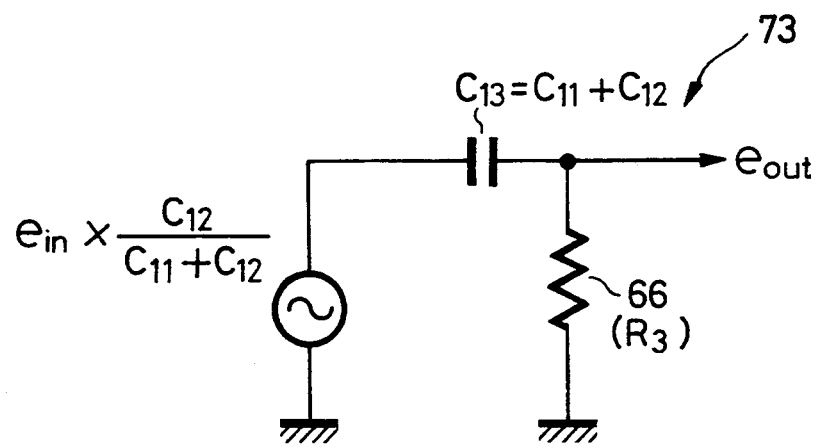
FIG. 20B is a diagram showing an equivalent circuit of the capacitor type voltage divider shown in FIG. 20A.

FIG. 20A shows a fundamental circuit arrangement of a capacitor type voltage divider 73. As shown in FIG. 20A, an output from an AC input signal source $e_{in}$ is divided by a series circuit of capacitors $C_{11}$, $C_{12}$ and a resistor 66 having a resistance value $R_3$ is connected between the output side of an output signal $e_{out}$ and the ground. FIG. 20B shows an equivalent circuit thereof. In this equivalent circuit, according to Thévenin's theory, the AC input signal source $e_{im}$ is replaced with an equivalent AC input signal source $e_{in} \times C_{12}/(C_{11}+C_{12})$ and the capacitors $C_{11}$, $C_{12}$ are replaced with an equivalent capacitor $C_{13}=C_{11}+C_{12}$.

As is clear from FIG. 20B, the capacitor type voltage divider 73 is arranged such that a divided signal $e_{in} \times C_{12}/(C_{11}+C_{12})$ is connected to a high-pass filter (HPF) formed of the capacitor $C_{13}$ and the resistor 66. A low band cut-off frequency ($-3$ dB) fc of this HPF is expressed as $fc = \frac{1}{2}\pi \cdot C_{13} \cdot R_3$. By way of example, if $C_{11}=10000$ pF, $C_{12}=20$ pF and $R=1 M\Omega$, then the voltage dividing ratio $1/N$ is set to $1/N=1/501$ and fc is set to $fc=15.9$ Hz. It is sufficient that the low band cut-off frequency fc is selected to be a value lower than a vertical frequency fv ($fc<fv$). That is to say, the low band cut-off frequency fc is selected to be a value such that a vertical frequency convergence correction can be carried out effectively.

Figure 21:
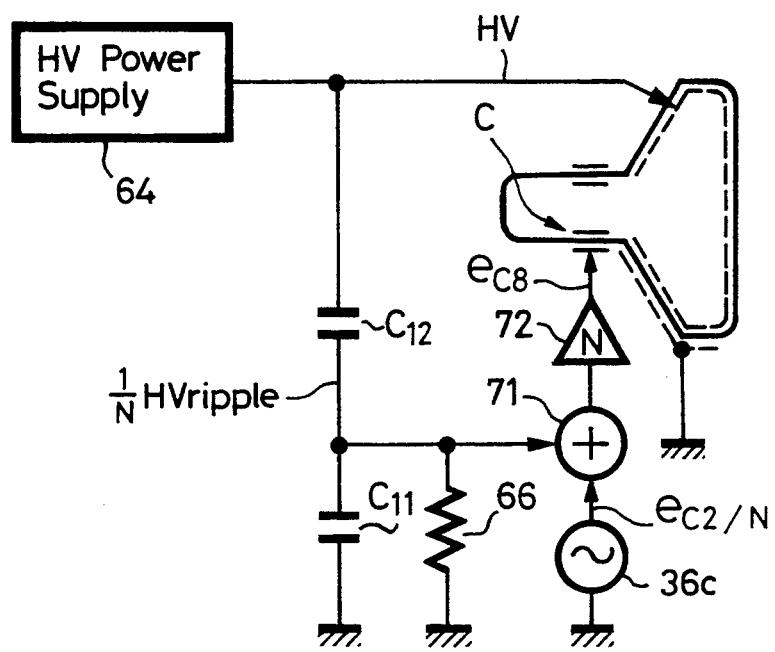
FIG. 21 is a circuit diagram showing a tenth embodiment of the present invention to which there is applied a capacitor dividing system ripple detecting/superimposing technique.

FIG. 21 shows a further example (tenth embodiment) of a resistance dividing system ripple detecting-/superimposing technique. In this embodiment shown in FIG. 21, the high voltage DC voltage HV containing the ripple component is divided by N (HVripple/N) by a voltage divider formed of the capacitors $C_{11}$, $C_{12}$, and a divided voltage is added to a convergence correction voltage $e_{c2}/N$ by the adder 71. The added result from the adder 71 is amplified N times by the amplifier 72 and then fed to the input side of the capacitor C as the convergence voltage $e_{c8}$ (see FIG. 17C). Thus, the convergence voltage $e_{c9}$ that is free from the occurrence of convergence error as shown in FIG. 17B is supplied to the low voltage side electrode plates 3, 4 of the color CRT.

Because the resistance type voltage divider is replaced with the capacitor type voltage divider and the high withstand voltage resistor is not utilized in the tenth embodiment shown in FIG. 21, this embodiment is excellent as compared with the embodiment shown in FIG. 18 from a money and space standpoint. It is, however, to be appreciated that the capacitor $C_{12}$ of high withstand voltage (about 30 kV or more) is not so small and inexpensive.

Figure 22:
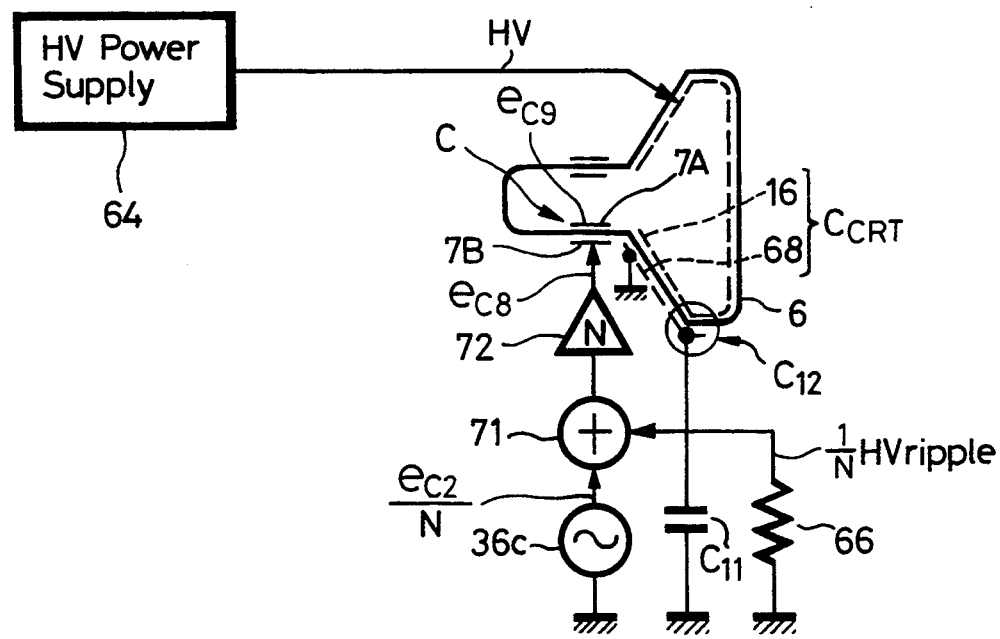
FIG. 22 is a circuit diagram showing an eleventh embodiment of the present invention to which there is applied a capacitor dividing system ripple detecting-/superimposing technique.

FIG. 22 shows a yet further example (eleventh embodiment) of a resistance dividing system ripple detecting/superimposing technique which can overcome the above-mentioned drawbacks.

In the eleventh embodiment shown in FIG. 22, a part of the outside conductive layer (outside carbon layer) 68 is cut out to isolate the same from the outside conductive layer 68 to thereby form a land (conductive layer) 75. With this arrangement, the inside conductive layer 16 (inside carbon layer) forms one electrode of the capacitor $C_{12}$ connected to the high voltage DC voltage HV, and the land 75 forms the other electrode of the capacitor $C_{12}$. A dielectric material is a glass that forms the tube envelope 6 of the color CRT.

It is sufficient that the capacitance value of the capacitor $C_{12}$ falls in a range of from several picofarads to several 10 s of picofarads. Thus, the area that the outside conductive layer 68 is cut out is not so large and the capacitor voltage divider thus formed can be operated sufficiently in actual practice. That is to say, it is customary that the conductive material such as carbon layer or the like is coated on the outside portion of the funnel portion of the color CRT to form the outside conductive layer 68. When this outside conductive layer 68 is grounded, the capacitor $C_{12}$ can be utilized as the capacitor $C_{CRT}$ (see the coating capacitance 40 in FIG. 3) for reducing the ripple component of the high voltage DC voltage HV. Because the capacitor $C_{12}$ is relatively small in capacitance, the capacitor $C_{12}$ can be formed with ease by utilizing the funnel portion at its area that is not yet used or a part of the outside conductive layer 68.

According to the eleventh embodiment shown in FIG. 22, the resistor or capacitor serving as discrete assembly parts directly connected to the high voltage DC voltage HV can be removed so that the dynamic convergence apparatus itself can be made small and inexpensive.

Figure 23:
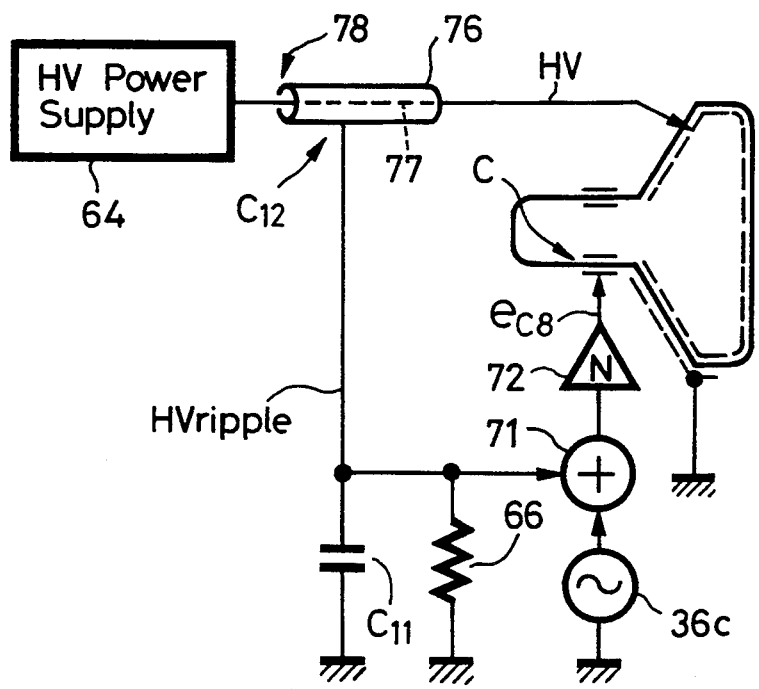
FIG. 23 is a circuit diagram showing a twelfth embodiment of the present invention to which there is applied a capacitor dividing system ripple detecting-/superimposing technique.

FIG. 23 shows a yet further example (twelfth embodiment) of a resistance dividing system ripple detecting/superimposing technique. In the embodiment shown in FIG. 23, as the voltage-dividing capacitor $C_{12}$, there is employed an insulating coated conductor 78 having an outer coating conductor 76 such as a knit wire or the like and in which a spacing between the outside coated conductor 76 and a core 77 is filled with a dielectric material such as polyethylene or the like. The core 77 of the insulating coated conductor 78 is utilized as a wire for supplying the high voltage DC voltage HV and also to one electrode of the capacitor $C_{12}$, while the outside coated conductor 76 is utilized as the other electrode of the capacitor $C_{12}$ and connected to the hot side (the side at which a signal is developed) of the capacitor $C_{11}$.

Figure 24:
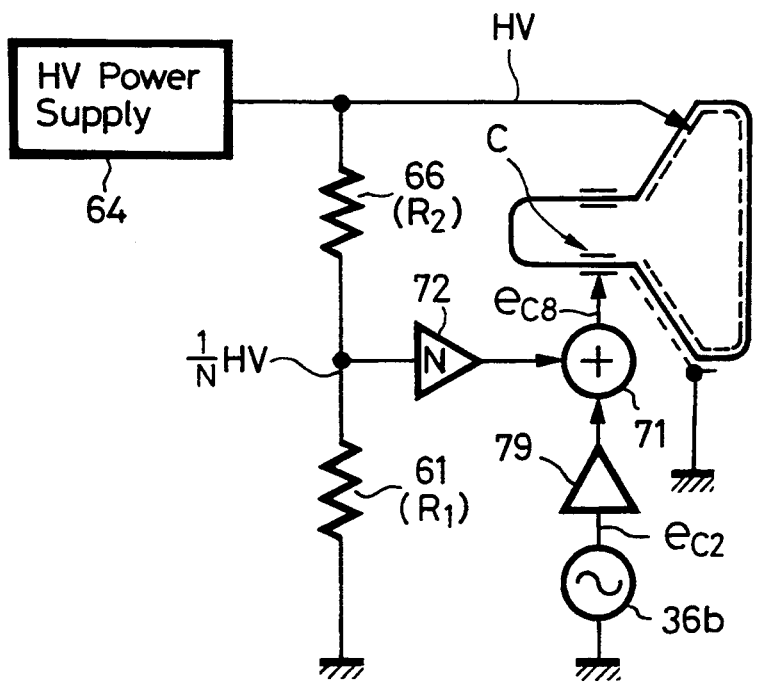
FIG. 24 is a circuit diagram showing a thirteenth embodiment of the present invention to which there is applied a resistance dividing system ripple detecting-/superimposing technique.
Figure 25:
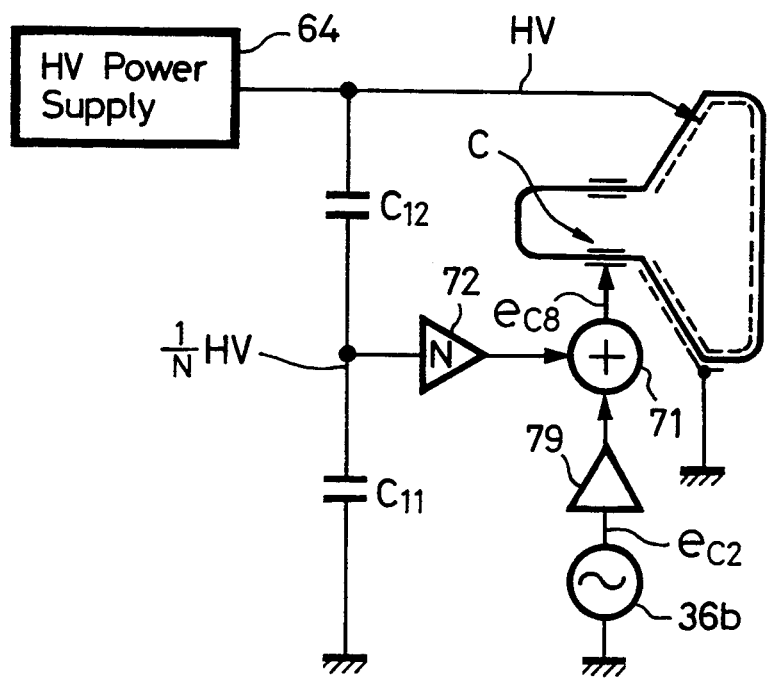
FIG. 25 is a circuit diagram showing a fourteenth embodiment of the present invention to which there is applied a capacitor dividing system ripple detecting-/superimposing technique.

FIG. 24 shows a still further example (thirteenth embodiment) of a resistance dividing system ripple detecting/superimposing technique shown in FIG. 18. FIG. 25 shows a still further example (fourteenth embodiment) of a resistance dividing system ripple detecting/superimposing technique shown in FIG. 21. In these embodiments, the amplifier 72 having the amplification degree N is not connected to the input side of the capacitor C but is interposed between one input side of the adder 71 and the voltage dividing point of the high voltage DC voltage HV. Further, as the convergence voltage correction signal generating source, there is utilized the convergence voltage correction signal generating source 36b that generates the convergence voltage $e_{c2}$. With the above-mentioned arrangement, when the amplifier 72 is made as a variable gain amplifier, the convergence error can be removed completely by adjusting the gain of the amplifier 72 while watching a cross-hatched picture displayed on the picture screen 51. An amplifier 79 interposed between the convergence voltage correction signal generating source 36b and the adder 71 is a buffer amplifier and therefore may be omitted. Such amplifier 79 may be replaced with a variable gain amplifier.

It is needless to say that the embodiments shown in FIGS. 24 and 25 in which the input side of the amplifier 72 is connected to the voltage-dividing point can be applied to the embodiments shown in FIGS. 22 and 23.

While the eighth to fourteenth embodiments in which the occurrence of convergence error can be avoided even when the high voltage DC voltage HV is suddenly changed are applied to the first embodiment as described above, the present invention is not limited thereto and such a variant is also possible. That is, the eighth to fourteenth embodiments are not limited to the first embodiment and may be applied to the second to seventh embodiments.

According to the present invention, since one end of the anode side of the diode of the parallel circuit of the high resistance value resistor and the diode is commonly connected to the pair of low voltage side electrode plates, the other end of the cathode side of the diode is commonly connected to the pair of high voltage side electrode plates, a high voltage DC voltage is applied to the pair of high voltage side electrode plates and the convergence voltage that results from adding the vertical parabolic wave voltage to the vertical blanking period of the modulated voltage amplitude-modulated by the parabolic wave of horizontal and vertical deflection periods is commonly supplied through the capacitor to the pair of low voltage side electrode plates, a spot distortion of the electron beam at the periphery of the picture screen of the color cathode ray tube is reduced and a focusing becomes satisfactory. Further, a dynamic focusing voltage that is required by the electron beam to focus the periphery of the picture screen can be reduced and the fine adjustment of the convergence become easy. Thus, the dynamic convergence apparatus of the present invention can be applied to a multi-scan monitor and shape a local voltage waveform with ease.

According to the present invention, since one end of the anode side of the diode in the parallel circuit of the high resistance resistor and the diode is connected to the pair of the low voltage side electrode plates and the other end of the cathode of the diode is connected to the terminal at which there is developed a DC voltage slightly lower than the high voltage DC voltage of the voltage divider that divides the high voltage DC voltage, in addition to the above-mentioned effects thus being achieved, the pair of high voltage side electrode plates and the pair of low voltage side electrode plates for dynamic convergence are utilized as the dynamic convergence means. Therefore, a newly added arrangement can be simplified.

Further, according to the present invention, the ripple component of the high voltage DC voltage is divided and detected and then added to the convergence correction voltage. Therefore, even when the dynamic convergence apparatus of the present invention is applied to, for example, a consumer television receiver in which a high voltage DC voltage is fluctuated considerably, the satisfactory convergence compensation characteristic can be maintained. Particularly, according to the present invention, since the capacitor whose one electrode is connected to the high voltage DC voltage to divide and detect the ripple component is arranged as the capacitor which utilizes the tube envelope of the color cathode ray tube as the dielectric material and in which the conductive layer is formed on the inner and outer surfaces of the tube envelope, discrete assembly parts need not be used. Also, the dynamic convergence apparatus can be simplified in arrangement and made inexpensive.

Further, according to the present invention, since the capacitor that supplies the convergence voltage to the low voltage electrode plates is constructed by the capacitor that is formed of the dielectric material formed of a part of the tube envelope and the conductive layer deposited on the inner and outer surfaces of the tube envelope and the high resistance value resistor and the diode are disposed within the tube envelope, the convergence voltage can be supplied from the outside of the color cathode ray tube with ease in addition to the above-mentioned effects.

Furthermore, according to the present invention, since the shield electrod is provided between the high voltage electrode and low voltage side electrode plate of the electron gun, the diode can be prevented from being damaged when the color cathode ray tube is knocking, in addition to the above-mentioned effects.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A dynamic convergence apparatus for a cathode ray tube having an electron beam generating means for generating first, second, and third electron beams, comprising:

a first pair of convergence plates arranged such that said second electron beam passes between the convergence plates;

a second pair of convergence plates arranged such that said first electron beam passes between one of said first pair of convergence plates and one of said second pair of convergence plates and said third electron beam passes between the other of said first pair of convergence plates and the other of said second pair of convergence plates;

means for generating a DC voltage applied to said first pair of convergence plates;

means for generating a convergence voltage having a first voltage waveform modulated by a parabolic signal with a horizontal deflection frequency and a parabolic signal with a vertical deflection frequency and a second voltage waveform of a parabolic signal of said vertical deflection frequency added to a horizontal retrace interval of said first voltage waveform; and means for supplying said convergence voltage to said second pair of convergence plates, said means for supplying including a series circuit of a capacitor, and a parallel circuit of a diode and a resistor, wherein a connection point of said capacitor and said parallel circuit is connected to said second pair of convergence plates and another end of said parallel circuit opposite to said connection point is connected to a reference voltage source.

2. The dynamic convergence apparatus as recited in claim 1, wherein said reference voltage source is said means for generating the DC voltage.

3. The dynamic convergence apparatus as recited in claim 1, wherein said reference voltage source includes a voltage dividing means across which said DC voltage is applied and an output of said voltage dividing means is connected to said another end of said parallel circuit.

4. The dynamic convergence apparatus as recited in claim 1, wherein said means for supplying said convergence voltage comprises a first series circuit of a first capacitor, a first parallel circuit of a first diode and a first resistor, a second series circuit of a second capacitor, a second parallel circuit of a second diode and a second resistor, a connection point of said first capacitor and said first parallel circuit is connected to one of said second pair of convergence plates, another end of said first parallel circuit opposite to said connection point is connected to said reference voltage source, a connection point of said second capacitor and said second parallel circuit is connected to the other end of said second pair of convergence plates, and another end of said second parallel circuit opposite to said connection point is connected to said reference voltage source.

5. The dynamic convergence apparatus as recited in claim 4, wherein said reference voltage source includes voltage dividing means across which said DC voltage is applied, and output of said voltage dividing means is connected to said another end of said first parallel circuit and said another end of said second parallel circuit, respectively.

6. The dynamic convergence apparatus as recited in claim 1, further comprising
a fifth convergence plate provided perpendicular to one of said first pair of convergence plates,
a sixth convergence plate provided perpendicular to one of said second pair of convergence plates,
a seventh convergence plate provided perpendicular to the other of said first pair of convergence plates, and
an eighth convergence plate provided perpendicular to the other of said second pair of convergence plates,
wherein said means for supplying said convergence voltage comprises a first series circuit of a first capacitor, a first parallel circuit of a first diode and a first resistor, a second series circuit of a second capacitor, a second parallel circuit of a second diode and a second resistor, said fifth convergence plate and said sixth convergence plate is arranged such that said first electron beam passes between said fifth convergence plate and said sixth convergence plate and said third electron beam passes between said seventh convergence plate and said eighth convergence plate, a DC voltage of said DC voltage generating means is applied to said fifth convergence plate and said seventh convergence plate, respectively, a connection point of said first capacitor and said first parallel circuit is connected to said second pair of convergence plates, another end of said first parallel circuit opposite to said connection point is connected to said reference voltage source, a connection point of said second capacitor and said second parallel circuit is connected to said sixth convergence plate and eighth convergence plate, respectively, and another end of said second parallel circuit opposite to said connection point is connected to said reference voltage source.

7. The dynamic convergence apparatus as recited in claim 6, wherein said reference voltage source includes voltage dividing means across which said DC voltage is applied and an output of said voltage dividing means is connected to said another end of said first parallel circuit and said another end of said second parallel circuit.

8. The dynamic convergence apparatus as recited in claim 6, wherein said means for supplying said convergence voltage further comprises a third series circuit of a third capacitor, a third parallel circuit of a third diode and a third resistor, a fourth series circuit of a fourth capacitor, and a fourth parallel circuit of a fourth diode and a fourth resistor, a connection point of said third capacitor and said third parallel circuit is connected to said eighth convergence plate, another end of said third parallel circuit opposite to said connection point is connected to said reference voltage source, a connection point of said fourth capacitor and said fourth parallel circuit is connected to said sixth convergence plate, and another end of said fourth parallel circuit opposite to said connection point is connected to said reference voltage source.

9. The dynamic convergence apparatus as recited in claim 8, wherein said reference voltage source includes voltage dividing means across which said DC voltage is applied and an output of said voltage dividing means is connected to said another end of said first parallel circuit, said another end of said second circuit, said another end of said third circuit, and said another end of said fourth circuit, respectively.

10. The dynamic convergence apparatus as recited in claim 1, wherein said capacitor is formed by conductive layers provided on an inside surface and an outside surface of said cathode ray tube, respectively.

11. The dynamic convergence apparatus as recited in claim 1, further comprising a screening electrode provided between said convergence plates and said electron beam generating means.

12. The dynamic convergence apparatus as recited in claim 1, further comprising means for detecting a ripple component of said DC voltage, and means for synthesizing said detected ripple component and said convergence voltage, an amplitude of said ripple component being equalized with an amplitude of said convergence voltage by said synthesizing means, the output signal of said synthesizing means being applied to said capacitor.

13. The dynamic convergence apparatus as recited in claim 12, wherein
said ripple component detecting means comprises a voltage divider having a dividing ratio of 1/N, and a coupling capacitor connected to said voltage divider of said detecting means, said voltage divider dividing said DC voltage, and
said synthesizing means comprises adding means, one input of said adding means is connected to said coupling capacitor, the other input of said adding means is connected to said means for generating, and amplifying means connected to an output of said adding means, said amplifying means having an amplification factor of N.

14. The dynamic convergence apparatus as recited in claim 12, wherein said ripple component detecting means comprises a voltage divider having a dividing ratio of 1/N, amplifying means having an amplification factor of N, and a coupling capacitor, one end of said coupling capacitor is connected to said voltage divider, the other end of said coupling capacitor is connected to said amplifying means, and said synthesizing means comprises adding means, one input of said adding means is connected to said amplifying means, and the other input of said adding means is connected to said convergence voltage generating means.

15. The dynamic convergence apparatus as recited in claim 13, further comprising comparing means for comparing the output of said voltage divider and a second reference voltage, and for stabilizing said DC voltage in response to the output of said comparing means, one input of said comparing means is provided with said second reference voltage, and the other input of said comparing means is connected to an output of said voltage divider.

16. The dynamic convergence apparatus as recited in claim 12, wherein said ripple component detecting means comprises a voltage divider having a dividing ratio of 1/N, said voltage divider comprising a plurality of capacitors dividing said DC voltage, and said synthesizing means comprises adding means, one input of said adding means is connected to an output of said voltage divider, the other input of said adding means is connected to said convergence voltage generating means, and amplifying means connected to an output of said adding means, said amplifying means having an amplification factor of N.

17. The dynamic convergence apparatus as recited in claim 12, wherein said ripple component detecting means comprises a voltage divider having a dividing ratio of 1/N, amplifying means having an amplification factor of N, and a coupling capacitor, said voltage divider comprising a plurality of capacitors dividing said DC voltage, one end of said coupling capacitor is connected to said voltage divider, the other end of said coupling capacitor is connected to said amplifying means, and said synthesizing means comprises adding means, one input of said adding means is connected to said amplifying means, and the other input of said adding means is connected to said convergence voltage generating means.

18. The dynamic convergence apparatus as recited in claim 13, wherein said voltage divider comprises a plurality of capacitors, each of said plurality of capacitors is formed by conductive layers coated on an inside surface and an outside surface of said cathode ray tube, respectively.

19. The dynamic convergence apparatus as recited in claim 13, wherein said voltage divider comprises a plurality of capacitors, and at least one end of each of said plurality of capacitors is formed by an insulating coated wire.

* * * * *